United States Patent [19]
Harrison

[11] Patent Number: 5,990,824
[45] Date of Patent: Nov. 23, 1999

[54] GROUND BASED PULSE RADAR SYSTEM AND METHOD PROVIDING HIGH CLUTTER REJECTION AND RELIABLE MOVING TARGET INDICATION WITH EXTENDED RANGE FOR AIRPORT TRAFFIC CONTROL AND OTHER APPLICATIONS

[75] Inventor: Earnest R. Harrison, Severna Park, Md.

[73] Assignee: Northrop Grumman Corporation, Los Angeles, Calif.

[21] Appl. No.: 09/100,727

[22] Filed: Jun. 19, 1998

[51] Int. Cl.$^6$ .................................................. G01S 13/534
[52] U.S. Cl. ............................ 342/160; 342/159; 342/36
[58] Field of Search .............................. 342/36, 159, 160, 342/161, 162, 202, 137

[56] References Cited

U.S. PATENT DOCUMENTS 4,578,676  3/1986  Harrison, Jr. ............................ 342/160
4,975,706  12/1990  Shrader ................................... 342/160

OTHER PUBLICATIONS

*IEEE Circuits And Systems Magazine,* "On An Adaptive Lattice Predictor And A Related Application", N. Ahmed and R.J. Fogler, vol. 1, No. 4, pp. 17–23.

Primary Examiner—Ian J. Lobo

[57] ABSTRACT

An MTI radar system transmits pulses with variable interpulse time periods and is structured with a lattice filter to process return signals to identify targets while substantially rejecting static and moving clutter. The MTI radar system also operates to reject adverse effects of transmitter instability in the processing of return signals. The MTI radar system is applied as an airport traffic control in which aircraft are detected as targets.

21 Claims, 14 Drawing Sheets

100 KNOT CLUTTER WITH VIP

300 KNOT CLUTTER WITH VIP

100 KNOT CLUTTER WITH −60dB WHITE NOISE

100 KNOT CLUTTER WITH −40dB WHITE NOISE

100 KNOT CLUTTER, UNIFORM PRF

100 KNOT CLUTTER

UNIFORM PRF, 100 KNOT CLUTTER −40dB WHITE NOISE

CLUTTER AT DC AND 100 KNOTS

GROUND BASED PULSE RADAR SYSTEM AND METHOD PROVIDING HIGH CLUTTER REJECTION AND RELIABLE MOVING TARGET INDICATION WITH EXTENDED RANGE FOR AIRPORT TRAFFIC CONTROL AND OTHER APPLICATIONS

BACKGROUND OF THE INVENTION

The present invention relates to ground based pulse radar systems and methods, and more particularly to the operation of airport-traffic-control radar systems which provide better moving-target-indications with better rejection of ground, meteorological, and other clutter echo signals.

In radar detection of aircraft or other moving targets, a pulse radar system functions to measure the position and range of a detected target on the basis of the time it takes for a pulse to reach the target and reflect back to the radar system. Theoretically, the operative target detecting range of a radar system depends primarily on the radar transmitter power, the antenna gain (or narrowness of beam width), the radar cross section of the target, and the received echo power (or the receiving antenna aperture and the receiver signal sensitivity).

However, other parameters enter into determining the actual range of a practical radar system. Transmitted pulse repetition frequency (PRF), set in the radar system design, normally limits the range of a radar system. Thus, the radar range may be limited by range ambiguities which may arise where the PRF is so high that echo signals from one pulse may return after the next pulse has been transmitted.

From the standpoint of the radar environment, clutter objects in the illumination field of the radar system produce clutter echo signals which significantly limit the effective moving target range of the radar system depending on the clutter rejection capability of the radar system. Thus, various ground and other objects return echo signals indicative of stationary clutter, moving objects such as rain or other meteorological objects return echo signals indicative of moving clutter, and moving targets return echo signals which are to be processed by the radar system receiver for display after separation from the clutter return signals.

The moving target echo signals accordingly may be detected and discriminated from extraneous signals, i.e., stationary and moving clutter echo signals and interference signals. Conventional radar systems have moving target detection capabilities which are limited in target detection range, clutter discrimination and rejection, and detection of otherwise falsely rejected moving targets.

The total radar cross section of clutter signals typically increases with distance from the radar transmitter. In the current state of the airport traffic control (ATC) or airport surveillance radar (ASR) art, the clutter cross section may be as great as one thousand or more times the radar cross section of a moving aircraft within the field of illumination and within the actual range of an actual radar system.

The effective moving target detection range of current, S-Band ATC radar systems may, at most, be about 50 to 60 miles on the basis of current moving aircraft detection and clutter rejection capabilities.

The speed of light is the basic factor which places this range limit on state-of-the-art ATC radar systems, with use of a PRF of 18 to 24 pulses per beam width of 1 to 2 degrees at an antenna scan rate of 60 degrees per second. To achieve significantly greater moving target detection range for airport traffic control or surveillance, military air surveillance, and other similar radar applications, a radar system must operate with significantly better clutter discrimination capability at a lower PRF. Other classes of radar systems, such as a class known as the TPJ 70, similarly cannot handle moving clutter and have a need for better clutter discrimination capability.

More particularly, ATC radar systems have typically been embodied as the moving-target-indication (MTI) type or the more recent moving-target-detector (MTD) type to monitor and control aircraft takeoffs and landings at airports. In these systems, the doppler shift in the echo pulse frequency of a moving aircraft target is used to distinguish the moving target from stationary objects or clutter even though the echo signals from the clutter may be much greater than the echo signals from the moving target.

The radar system circuitry extracts doppler information from the transmitted and target echo signals, and determines moving target position and velocity from the doppler information.

The MTI radar system is a pulse radar system which mixes a coherent (COHO) reference signal with down converted echo signals returning from ground or other stationary clutter, moving clutter, and moving targets and any received noise and interference signals. An output signal from the mixer represents doppler information, since a mixer output signal includes a DC signal, representative of stationary clutter, and a varying signal, representative of moving targets and moving clutter. The varying signal occurs to the extent that the frequency of the echo signals differ from the COHO reference frequency (i.e., the original pulse transmission frequency) as a result of motion of objects from which the echo signal is received.

In addition, the mixer aliases moving target echo signals as zero doppler signals when the target is moving at a speed which results in a position change equal to an integral number of half-wavelengths of the transmitting frequency. In other words, conventional MTI radar systems falsely reject moving target echo signals when the target has a stroboscopic appearance of being still and when the radar system cannot independently detect a position change because the limited amount of target movement between transmitted radar pulses is less than the position resolution of the radar system.

Known MTI radar systems therefore use additional processing in an attempt to detect all moving target echo signals while separating moving target echo signals from clutter, and noise signals for output display. MTI radar systems often employ variable timing between transmitted pulses on a pulse by pulse basis to circumvent false rejection of moving target echo signals. However, this approach has limited effectiveness because it is coupled with filtering fixed at the time of design as described below.

Further, conventional MTI radar systems do not address rejection of moving clutter and thus cannot reject moving clutter doppler signals while passing moving target doppler signals. The conventional MTI system output display thus contains both moving target and moving clutter images, and the system operator must distinguish each from the other.

Prior-art MTI radar systems use hardware or software high-pass filtering to block clutter based on its expected spectral characteristics. The filter characteristics are normally fixed in the design stage of a conventional MTI radar system to reject optimally a specific type of clutter or a specific group of clutter types. A CFAR (constant false alarm receiver) may be provided to allow the system target detection threshold to ride above the noise-plus-clutter residue level thereby characterizing the MTI radar with limited adaptivity at the CFAR level but not at the filtering level.

In any case, if the actual clutter spectrum differs from the spectrum assumed for MTI radar design purposes, system degradation occurs during MTI radar system use for moving target detection. Such degradation may result from failure to remove clutter outside of zero notches, or from excessive attenuation of moving target signals due to an excessively wide clutter notch, or from a combination of these two effects.

Overall, conventional MTI radar systems have had limited effectiveness in rejecting clutter and in detecting and displaying moving targets for ATC and other applications. Further, the effective moving target detection range has been significantly limited by system design compromises needed to reach such limited target detection effectiveness. Although MTI radar systems employ variable interpulse spacing to provide some flexibility in the illumination waveform, these systems provide no filter adaptivity to actual clutter conditions as explained above.

The conventional MTD radar system is another kind of system which has been used and is currently being widely used for moving target detection in ATC and other applications. In MTD radar systems, pulses are transmitted at a fixed frequency in successive pulse bursts, and the pulse frequency can be varied from burst to burst.

Conventional MTD radar systems employ filter banks to achieve clutter rejection with some increase in adaptivity, as compared to conventional MTI radar systems. Thus, independent CFAR detectors can be used on the outputs of the respective filters, and the filter response can be varied with limited adaptivity toward matching actual clutter characteristics.

However, the actual filter characteristic shapes must be specified in the MTD system design stage to optimize removal of expected clutter spectra as opposed to actual clutter spectra to be faced in system operation. In this connection, parameters such as sidelobe level and main lobe width and position must also be set in the design stage.

Although the prior-art MTD radar systems have some additional adaptivity beyond that available in conventional MTI systems, such MTD systems have had limited effectiveness in detecting moving targets due to limited moving target detection range and restrictions imposed by batch PRF processing. For example, each pulse burst has a fixed PRF with fixed interpulse time periods in each pulse burst, and the PRF can only be changed in the time between pulse bursts. This restriction significantly limits the capability of the MTD radar system to find falsely rejected moving targets which are moving at a blind speed(s) for which echo signals are blocked by the filter bank. In other words, MTD radar systems have lacked flexibility in finding satisfactory illumination waveforms which enable good target detection coupled with good clutter rejection under actual operating conditions.

In addition, filter banks like those used in conventional MTD radar systems are suitable for use only with a constant PRF. Thus, clutter rejection regions formed by the filter bank are replicated at multiples of the PRF. Several bursts of radar illumination pulses, each burst with a different PRF or carrier frequency, are required for each radar search resolution cell to provide detection coverage for blind speeds. Since the pulse bursts must be combined noncoherently, additional observation time, implied by the multiple bursts, fails to provide improved spectral or cross-range resolution.

In view of the state of the ground based, pulse radar system art, and specifically the ATC radar system art, a need clearly exists for an improved ground based, pulse radar system characterized with better moving target detection, extended moving target detection range, and better clutter rejection based on better adaptivity to actual clutter conditions. This need especially applies to airport traffic control since meeting it translates into better airport controller operations and better aircraft safety based on reliable detection of all aircraft at greater distances regardless of clutter and weather conditions.

SUMMARY OF THE INVENTION

A pulse radar system comprises an antenna system for transmitting and receiving radio frequency signals and a transmitter for generating successive transmit pulses coupled to the antenna system for radiation to a field of illumination defined by operation of the antenna system. A control system varies lengths of successive interpulse periods (IPPs) between the successive transmit pulses in accordance with a pattern thereby enabling the radar system to avoid false rejections of moving targets. A receiver converts a composite, analog radio frequency signal received from the antenna system to a baseband video signal comprising a stream of digital data having combined in-phase and quadrature components. The digital data stream is formed by successive range gates generated at a set sampling rate and representing information content in the radio frequency signal including target information and stationary and moving clutter information. A target detecting system is synchronized with the transmitter by the control system. The target detecting system processes each range gate in a group of range gates including successive range gates preceding the range gate being processed and successive range gates subsequent to the range gate being processed to determine signal characteristics present in a preponderance of the range gates in the group as being unwanted. The target detecting system adaptively cancels unwanted signal characteristics thereby generating range gates which contain target information as digital target signals for display with little or no residue of stationary or moving clutter.

BRIEF DESCRIPTION OF THE DRAWINGS

The accompanying drawings, which are incorporated in and constitute a part of this specification, illustrate a preferred embodiment of the invention and together with the description, provide an explanation of the objects, advantages and principles of the invention. In the drawings.

DISCLOSURE OF THE INVENTION

A ground based radar system of the invention transmits pulses at a relatively low rate with controllable variation of interpulse time periods, cancels DC clutter components from echo signals, and adaptively processes doppler signals derived from the echo signals. The doppler signal processing employs filtering which is effective, in conjunction with the controlled interpulse time variation, to detect otherwise falsely rejected moving targets and to reject moving or other clutter signals otherwise incorrectly passed for display. As a result, ATC and other ground based radar systems of the invention provide better moving target detection, better clutter rejection, and extended moving target detection range.

In ATC applications, the invention thus facilitates controller operations and significantly enhances aircraft safety.

Figure 1:
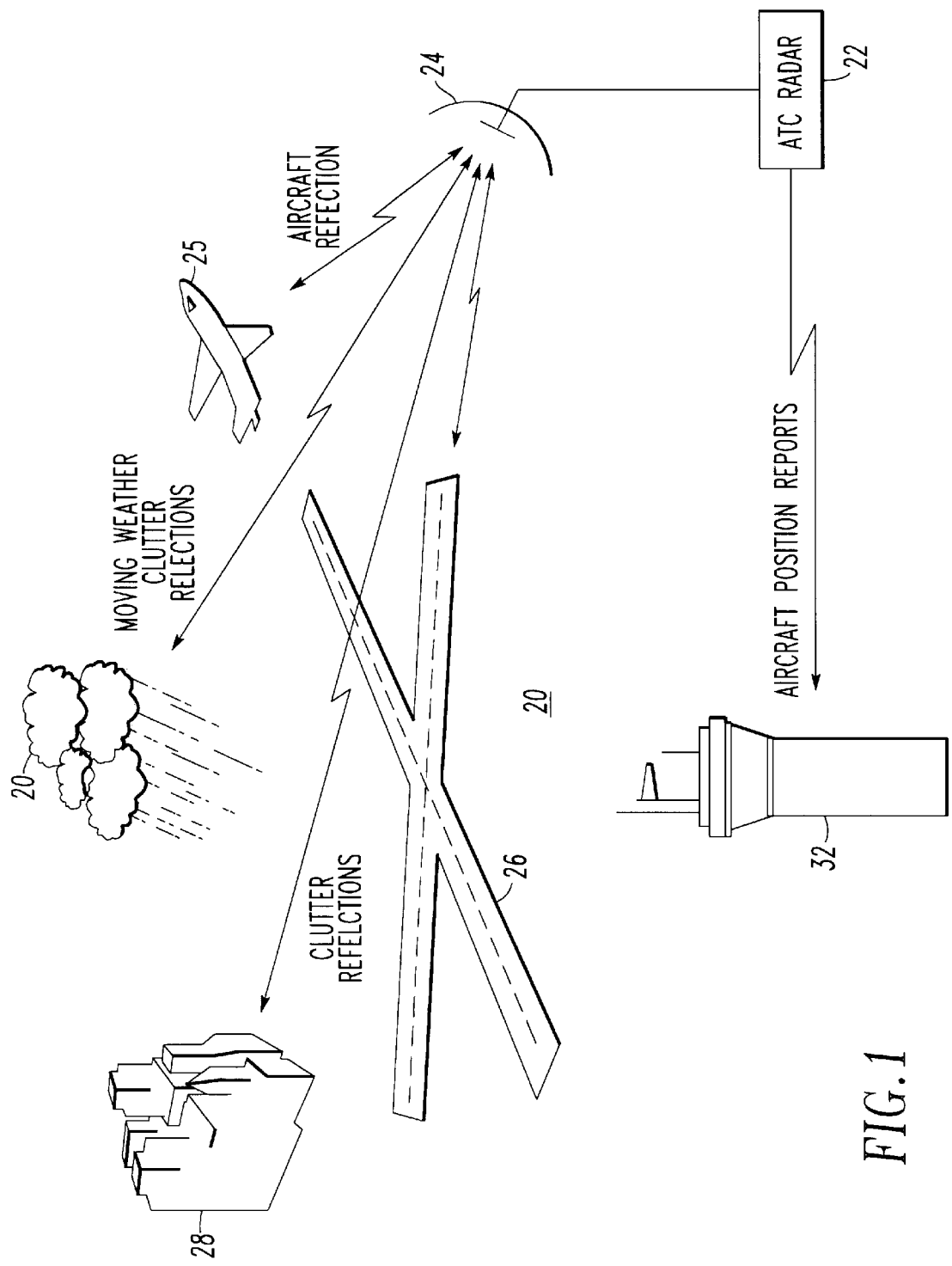
FIG. 1 is a schematic diagram of an airport with a ground based radar system in the form of an ATC (airport traffic control) radar system characterized with advantageous MTI operating features and structured in accordance with the invention to operate adaptively with better clutter rejection, better moving target detection, and extended moving target detection range.

In FIG. 1, a schematic diagram is shown for an airport 20 having a preferred embodiment of a ground-based radar system of the invention. Thus, an ATC radar system 22 of the invention employs a scanning, transmitting/receiving antenna 24 to transmit radar pulse signals through an illumination space and to receive echo or reflection signals as well as any incident interference and noise signals. The antenna beam width, the antenna beam azimuth, the antenna scanning rate, and other antenna design features are determined in accordance with radar system design considerations.

In the current state of the ATC art, ATC antenna systems are structured to provide beam scanning by means of mechanical rotation, primarily because of cost considerations. However, in application, the invention can employ antenna systems which use other scanning schemes including electronic solid state antenna systems which employ electronic control of beam azimuth and direction.

The reflection signals include reflections from moving targets to be detected, i.e., an aircraft 25 as well as any other aircraft (not shown) which may be within the target detection range of the ATC radar system 22. The reflection signals further include stationary and moving clutter reflections, such as those from a runway structure 26, from other ground objects 28 which are stationary, moving as a whole, or stationary with moving parts (such as a tree), and from other moving clutter 30, such as birds, rain cells or other weather systems or events.

The ATC radar system 22 processes received signals to detect moving target detection signals, which are to be passed, and to reject or block non-target signals. Thus, aircraft position reporting signals are transmitted to display apparatus (not specifically shown in FIG. 1) located in an airport tower 32 for airport controller use in traffic control.

Figure 2:
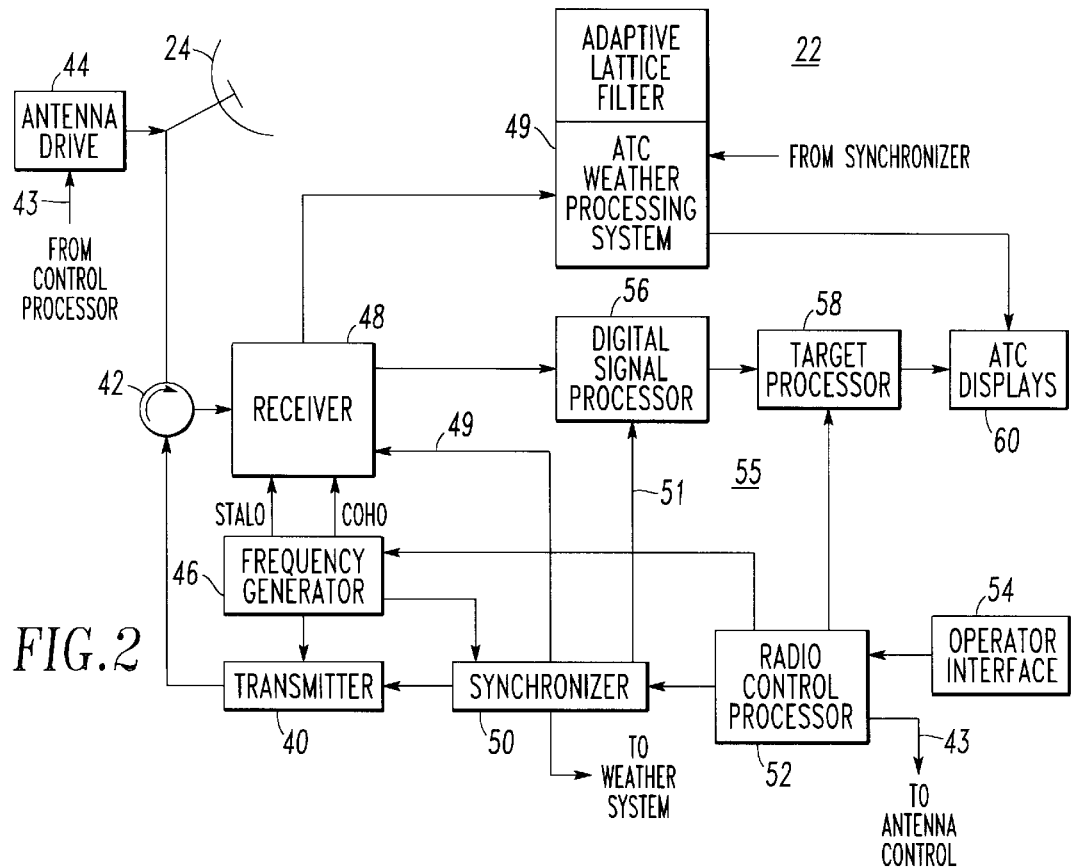
FIG. 2 shows a hardware block diagram of the structural organization of the ATC radar system of FIG. 1.
Figure 8:
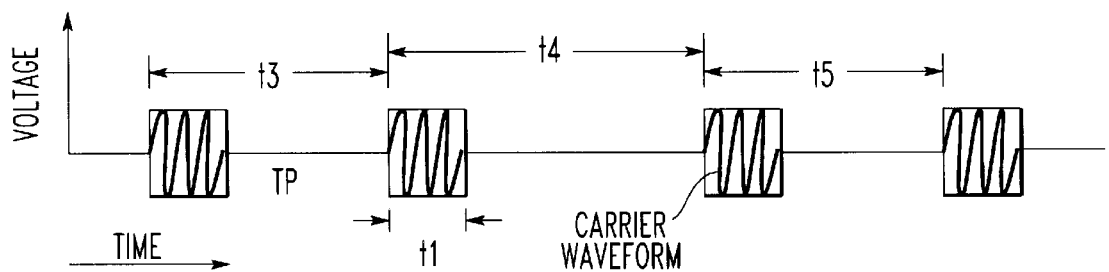
FIG. 8 illustrates a waveform of successive pulses transmitted by a transmitter in the radar system of FIG. 2.

The ATC radar system 22 is shown in greater hardware block detail in FIG. 2. A transmitter 40 includes an amplifier (not shown) which amplifies an input carrier frequency signal under ON/OFF pulse modulation control to generate an output signal containing successive transmission pulses of the carrier signal occurring at a predetermined PRF. As shown in FIG. 8, a carrier signal 23 is applied to an amplifier in the transmitter 40 to produce successive output transmission pulses TP under ON/OFF, computer-based, modulating-pulse control as subsequently explained herein.

Each transmitted pulse may have a time width t1, such as about 1.5 microseconds and embraces numerous carrier cycles, typically up to or more than 3000 cycles. However, in FIG. 8, each pulse TP is shown as only embracing 3 carrier cycles to facilitate illustration of this concept.

Although the transmission pulses TP have a nominal phase of the carrier, transmitter instability can cause this phase to vary to a degree dependent on the transmitter design. Transmitter instability, which leads to slightly varying carrier phase is significant since echo pulse changes reflecting changes in transmitter pulse phase may be erroneously interpreted as Doppler information in receiver processing.

In the prior art, it has been customary to address transmitter instability problems by developing costly, highly stable transmitter designs which substantially reduce pulse phase variation. The invention advantageously addresses transmitter instability problems by providing adaptive return pulse processing which cancels effects of transmitter instability and thereby enables use of less costly transmitters having limited instability in operation.

The transmission pulses TP occur with a pulse repetition frequency (PRF), such as 200 to 300 HZ, and are spaced from each other in time by an interpulse time period IPP (typically in milliseconds) which varies according to a computer controlled pattern. To illustrate this concept in FIG. 8, a first interpulse time period IPP is shown as having a time span of t3, and second and third IPP are shown as having greater time spans of t4 and t5.

Generally, in operation of the invention, IPP variation facilitates adaptive clutter cancellation and avoidance of false rejection of moving targets as explained hereinafter. In the prior art, IPP variation has been used in MTI systems prevalent in the past, but such systems have essentially been incapable of identifying moving clutter signal components for cancellation and has thus been deficient in processing moving target signal components for display.

The system operation is adaptive in the sense that received signals are processed to identify target and clutter components, and thereafter to respond adaptively to cancel the clutter components from the received signals and generate the target components for output.

In the transmit mode, the transmission pulses are coupled to the antenna 24 through a transmission path in a circulator 42 for radiation in a beam of predetermined azimuth and angular width such as 2 degrees. The antenna 24 is rotated by a drive 44 to provide a 360 degree field of illumination at a predetermined scan rate such as 10 scans per minute. As indicated by the reference character 43, a radar control processor 52 provides supervisory control over the antenna drive 44.

A frequency generator 46 provides a local oscillator RF signal (STALO) at a stable frequency (such as 2940 MHz) and a coherent reference signal (COHO) at an intermediate frequency (IF) level (such as 60 MHz). The STALO and COHO signals are combined to form a carrier signal (at the exemplary frequency of 3000 MHz) which is applied to a transmitter amplifier for output as transmission pulses at a controlled IPP as described above. In addition, the STALO and COHO signals are applied to a receiver 48 for processing echo and other signals received by the antenna 24.

A synchronizer 50 responds to the carrier signal from the frequency generator 46 and an interpulse timing control signal from the radar control processor 52 (1) to provide ON/OFF modulation control of the transmitter amplifier with corresponding transmission pulse generation as described and (2) to vary the interpulse time period between successive transmission pulses. As a result, the transmitter 40 generates transmission pulses at the PRF subject to variation in the time period between successive individual pulses in accordance with interpulse timing command signals from the radar control processor 52.

The synchronizer 50 is also coupled to the receiver 48 to synchronize analog-to-digital conversion, performed therein, with the generation of transmission pulses by the transmitter 40 and to synchronize receiver filtering with successive interpulse time delays in the transmitter, as indicated by the reference character 49.

The radar control processor 52 is generally programmed to provide basic control over the operation of the ATC radar system 22. Thus, a digital control is included in the radar control processor 22 to generate the interpulse timing control signals for the synchronizer 50 in accordance with a programmed pulse sequencing pattern. This pattern defines those pulses in a sequence of pulses for which the interpulse time period is to be varied as well as the amount of time variation for each varied interpulse time period.

In general, the interpulse timing pattern is set in the radar design stage preferably to achieve the best overall radar system performance at the PRF of the radar system 22. However, an operator may change the interpulse timing pattern when the radar system is placed in use.

The circulator 42, passes the received energy to the receiver 48 as well as any interference and noise signals that may be present. After down converting the received RF composite analog signal to an IF composite analog signal having the information content of the RF composite signal, the receiver 48 (FIG. 2) performs a mixing of analog signals, generates a converted, complex-video, digital signal, and outputs the converted digital signal to an ATC weather processing system 49 and to a digital signal processor 56 (DSP) in a target processing system 55.

In the target processing system 55, the converted, complex-video signal is adaptively filtered to cancel unwanted signals and to pass moving target signals. The target signals are processed for display.

In the target processing system 55, the DSP 56 employs adaptive filtering to cancel clutter and other unwanted signals and to detect and pass moving target signals for further processing. The synchronizer 50 synchronizes signal processing in the DSP 56 with the variably timed modulating pulses triggered by the synchronizer 50 as indicated by the reference character 51.

The DSP 56 applies a target signal output to a target processor 58 for development of image signals for display. The target signal output may contain a small amount of clutter imagery, but any such amount is significantly less than that which is typically present in prior-art ATC systems of the MTI or MTD types. Overall, as previously indicated, pulse radar systems of the invention function with better target detection, better clutter rejection, and extended target detection range. Reference is made to APPENDIX A for a more detailed explanation of shortcomings of the prior art which enable the advantages of the invention to be better understood.

The radar control processor 52 applies data signals to the target processor 58 for use in processing detected target signals. Such data signals include antenna azimuth, radar operating frequency, current PRF, and any special operator commands entered through the operator interface 54.

The target processor is programmed to use stored and acquired data in generating target image signals which are applied to conventional ATC display units 60 for use in airport controller operations. The display units 60 include units dedicated to target displays and units dedicated to weather displays generated by the ATC weather processing system 49. A basis is thus provided for safely routing aircraft around storms.

Figure 3:
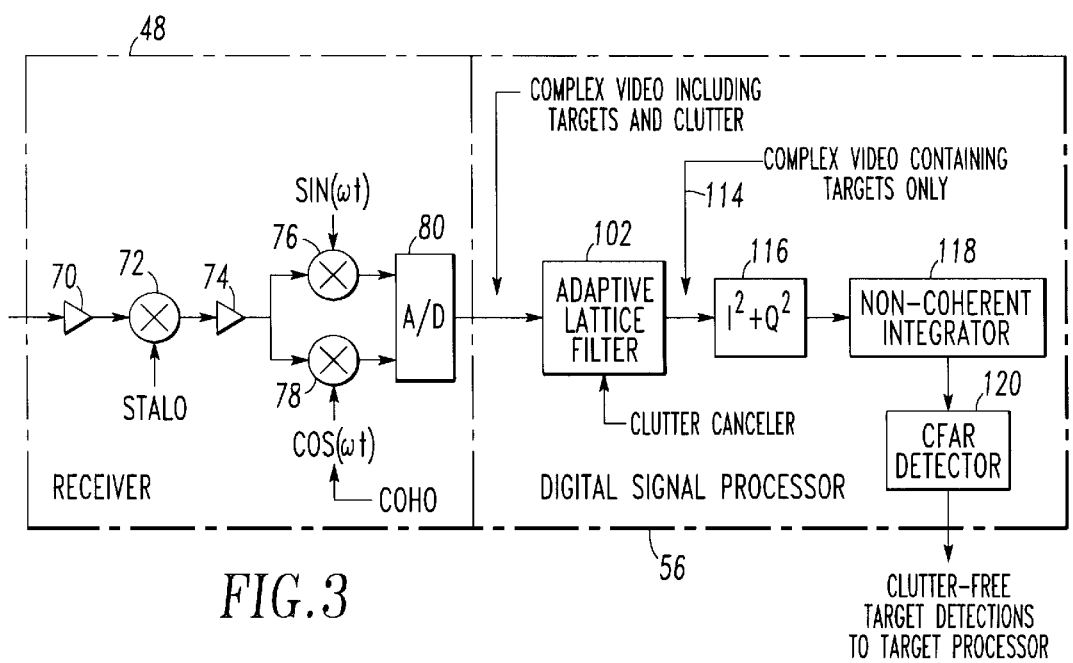
FIG. 3 is a functional block diagram which broadly illustrates the functioning of a receiver and a signal processor of the ATC radar system of FIG. 2.

The receiver 48 and the DSP 56 are shown in greater detail in FIG. 3. A composite RF signal received from the antenna 24 is applied to a low noise RF amplifier 70 which has its output coupled to a downconverting mixer 72 for mixing with the STALO signal.

The mixer 72 applies an output signal, including a DC clutter component and a downconverted, frequency difference or doppler signal, to an IF amplifier 74. In turn, the IF amplifier 74 produces an amplified output signal having signal information content corresponding to the signal information content of the return signal received from the antenna 24. The IF amplifier 74 applies its output to a quadrature mixer 76 and an in-phase mixer 78 (see the block 94 in FIG. 9).

The in-phase and quadrature mixers 76 and 78 convert the IF signal to baseband video with use of conventional techniques. The in-phase and quadrature signals are phase displaced by 90 degrees from each other and are derived from the COHO signal received from the frequency generator 46. The IF baseband-video composite is a complex signal, and it is represented by its in-phase and quadrature components I and Q, as described, to enable conversion of the IF analog composite signal to a digital form which continues to contain the information content of RF return signals received by the antenna.

An analog-to-digital (AD) converter 80 converts the analog I and Q signals to a digital output signal with a predetermined sampling rate, such as 1 MHz. The A/D converter 80 outputs a complex video signal, including target and clutter information received at the RF level, in the form of a stream of digital data at the A/D converter sampling rate.

The in-phase and quadrature signals I and Q are processed in separate converter channels or in a single converter channel on a multiplexed basis. In either case, the converted I and Q signals are combined in a single data stream and applied as the complex-video digital output signal to the DSP 56. As successive transmission pulses are echoed and returned, successive digital output signals are generated by the A/D converter 80 in correspondence to transmission pulse returns. Synchronous system operation is regulated by the synchronizer 50 as previously explained.

Each digital output signal from the converter 80 represents a digital sample of the analog waveform being converted. The A/D sampling rate is typically about 1 MHz, and each digital signal corresponding to an analog sample is referred to as a range gate or a cell. A target return in the composite analog signal may be contained in a single range gate, or may spread over two or three range gates in some instances.

Successive digital range gate signals are processed with filtering in the DSP 56 to output substantially only moving target signals for display.

An adaptive filter 102 (FIGS. 3–5) preferably processes the return digital signals for target detection and cancellation of unwanted signals. The adaptive filter 102 is preferably a lattice filter structured by an algorithm executed in the DSP 56.

Conventional lattice filter architectures lack a capability for interfacing with radar system elements to provide adaptive return pulse filtering when transmission pulses are generated with variable interpulse time periods for the purpose of avoiding false rejections of moving targets. Reference is made to an article entitled ON AN ADAPTIVE LATTICE PREDICTOR AND A RELATED APPLICATION authored by N. Ahmed and R. J. Fogler in IEEE Circuits and Systems magazine, Vol. 1, No. 4, pages 19–23 for more information on conventional lattice filters.

In the present invention, adaptive filtering is applied to successive range gates which represent analog return signals having echo components resulting from successive variably time spaced transmission pulses. In the range gate signals, a particular signal characteristic is adaptively cancelled (rejected) if the sliding window calculations show that it is present in a preponderance of cells over a predetermined time span.

As a result, contrary to the prior art, the invention provides highly effective filtering with use of transmission pulses variably spaced in time, correctly detects and passes moving target signals, and essentially cancels stationary and moving clutter. In sum, the invention enables an MTI type pulse radar system to be structured and operated so as to function successfully in detecting moving targets and rejecting static and moving clutter and thereby highly desirable for use in ATC and other applications.

In another general aspect of the invention, the effects of radar transmitter instabilities are removed from the signal processing in the radar receiver. Thus, pulse-to-pulse phase and gain variations can be substantially reduced thereby enabling significant reductions and economies in radar transmitter power supply filtering requirements.

In the prior art, one of the basic limitations in the performance of an MTI radar is the stability of the radar transmitter chain. Considerable care must be taken in designing the transmitter power supply to reduce the power supply noise and ripple to levels which enable the prior art MTI radar system to perform at a good level relative to its capability.

The invention economically reduces the effects of transmitter instability without the prior-art need for costly power supply regulation and filtering. Accordingly, the invention enables existing transmitter designs to be applied in MTI systems of the invention without costly design modifications.

The invention reduces the negative effects of STALO instability, in the same way that it reduces the negative effects of transmitter instabilities.

The receiver filtering of the invention employs an adaptive notch which provides notch movement as needed essentially to remove clutter with little restriction from transmitter and other instability effects thereby substantially negating negative consequences of such effects. Reference is made to APPENDIX B for more detail related to the instability-effects feature of the invention.

More specifically, in the digital signal processor 56 (FIG. 3), the preferred adaptive lattice filter 102 (FIG. 4) is structured in software or hardware and has an input 104 to which digital signals (complex data stream) are applied from the radar receiver 48. The input 104 is divided into an upper signal line 106, to which the input signal is applied without delay, and a lower signal line 108 to which the input signal is delayed by one interpulse period.

A selected number M of adaptive filter stages or blocks 112 are connected in the lines 106 and 108. In this case four adaptive blocks 112A–112D are employed. In the time-delay signal line 108, an interpulse time delay IPP is applied at the input to each adaptive block 112A through 112D. The time delay of each IPP is synchronized to the pulse delays executed in the transmitter 40, so as to allow corresponding range gates to be brought together and processed by the DSP 56.

The successive adaptive filter blocks 112A–112D form the preferred lattice structure and progressively refine the filtration of the incoming digital signals until clutter is substantially removed and moving targets are detected in an output signal indicated by arrow 114 (FIG. 3). In essence, the adaptive block 112A compares the undelayed and the delayed complex inputs to find the complex difference which is residue containing target information, noise, and clutter. Successive adaptive filter blocks 112 similarly develop complex signal differences with progressively reducing noise and static and moving clutter components. The finally generated output contains the detected target signals with little or substantially no clutter residue.

The real I and quadrature Q components of the output signal are each squared and summed as indicated by block 116 in FIG. 3. The resulting complex output signal is applied to a conventional noncoherent integrator 118 (FIGS. 3 and 4) where energy is accumulated for the duration of time that the antenna is pointing at a target so as to maximize system sensitivity to targets.

The integrated signal is applied to a conventional CFAR detector 120 which passes signals above a selected threshold level. The CFAR detector 120 estimates or measures the noise and residual clutter level and sets an optimum threshold for target detection. The digital signal processor 56 applies detected moving target signals from the CFAR detector 120 to the target processor 58 for display processing as previously described.

Figure 9:
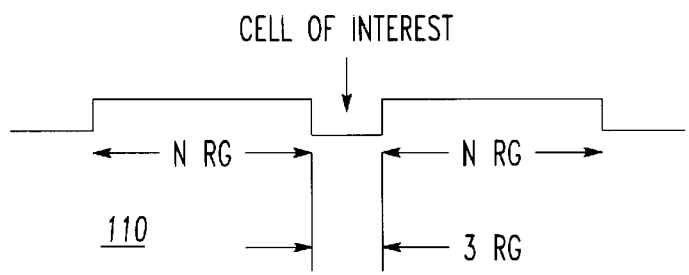
FIG. 9 is a graphic which illustrates a sliding window concept employed in an adaptive filtering process of the invention.

In the operation of the adaptive filter 102, successive digital return signals sampled from the received composite analog waveform are processed by hardware or software which provides adaptive filtering. The digital return signals (or range gates or cells) are preferably sequentially grouped together and moved through a sliding window integrator arrangement employing a sliding adaptivity window integrator 110 as shown in FIG. 9. Thus, the adaptivity window 110, at a particular instant of time, is formed with a sequential group of cells excluding a centrally located group of three cells, with the cell of interest, i.e. the cell being processed with target detection and clutter cancellation calculations, being located at the window midpoint.

The adaptivity window 110 provides a look at a group of cells near the cell of interest, typically sixteen cells on each side of cell of interest. However, the window approach of the invention is operable for integration times other than that corresponding to the integration time for the typical cell grouping.

An adaptivity window of cells corresponds to a return data sequence which is statistically and integratively processed to determine adaptively which cells contain target returns and which cells should be cancelled as clutter or other unwanted returns.

The centrally located cell group preferably has one cell in front of the cell of interest and one cell following the cell of interest. This avoids processing problems which could arise in instances where a large moving target might be reflected in two successive cells as opposed to a single cell.

The adaptivity window 110 has N cells in front of the cell midgroup and N cells following the cell midgroup. The adaptivity window 110 is thus formed by (2N+3) cells, with the signal values associated therewith mathematically processed through the adaptive filter block 112 (FIG. 5).

As time advances, each new cell enters the adaptivity window 110 from the left of FIG. 10, and the oldest cell exits from the adaptivity window 110 from the right of the adaptivity window 110. In this sense, the adaptivity window 110 slides along the train of incoming digital signals at the rate of 1 MHz, and, with each advance of the adaptivity window 110, a new adaptive filtering calculation is made for the next cell which moves into the cell-of-interest-position.

Figure 5:
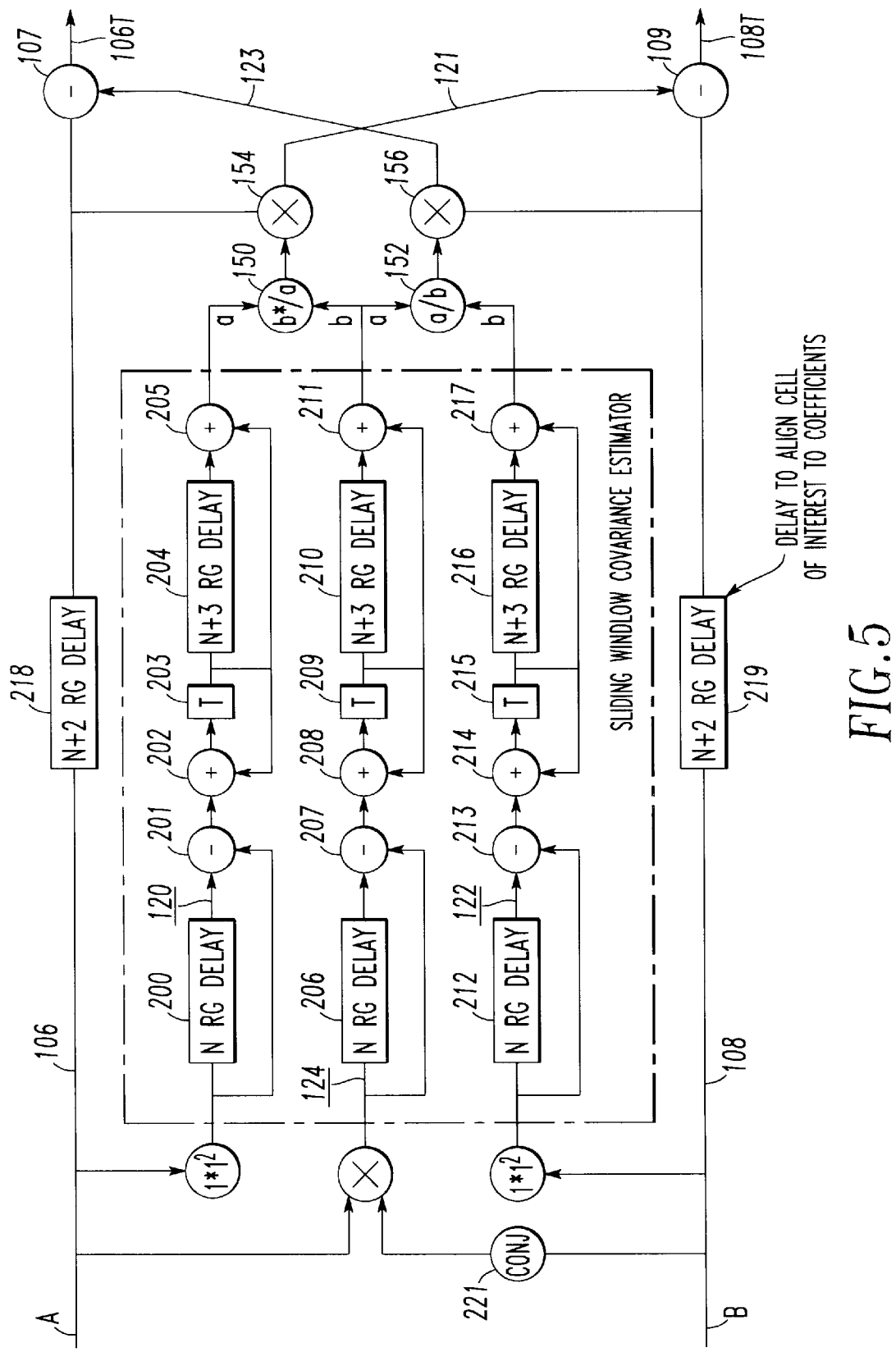
FIG. 5 is a functional diagram which illustrates the structure and operation of the adaptive blocks of FIG. 4.
Figure 6:
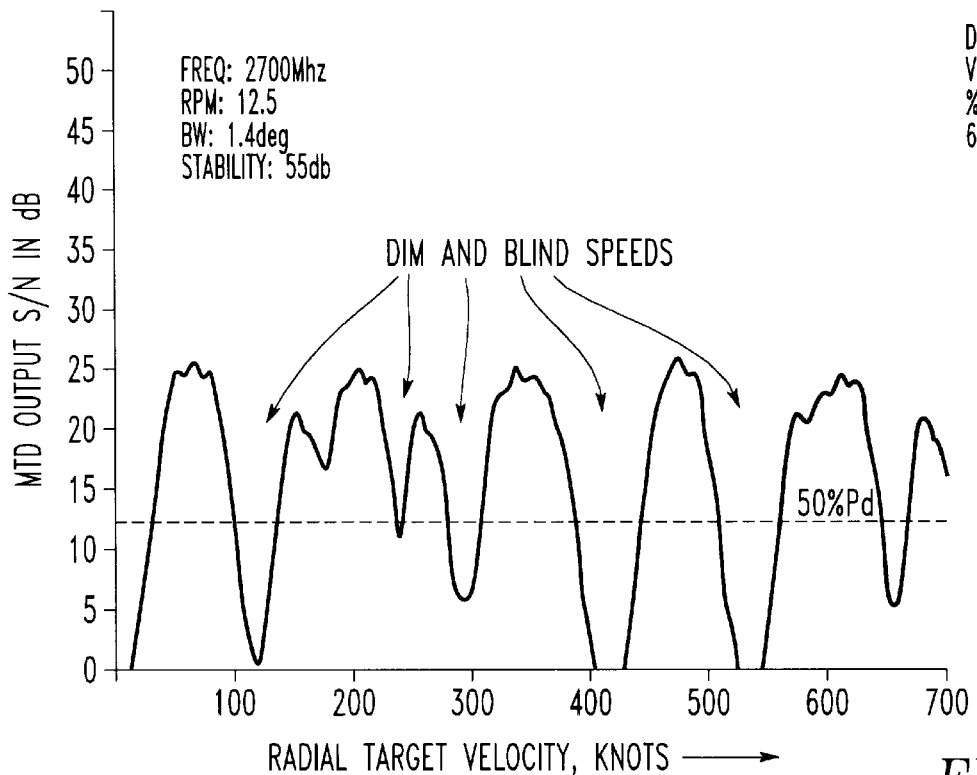
FIG. 6 is a graphical representation of the target detection performance of a conventional, state-of-the-art MTD radar system applied to airport traffic control when the radar is illuminating a mixture of fixed and moving clutter.
Figure 7:
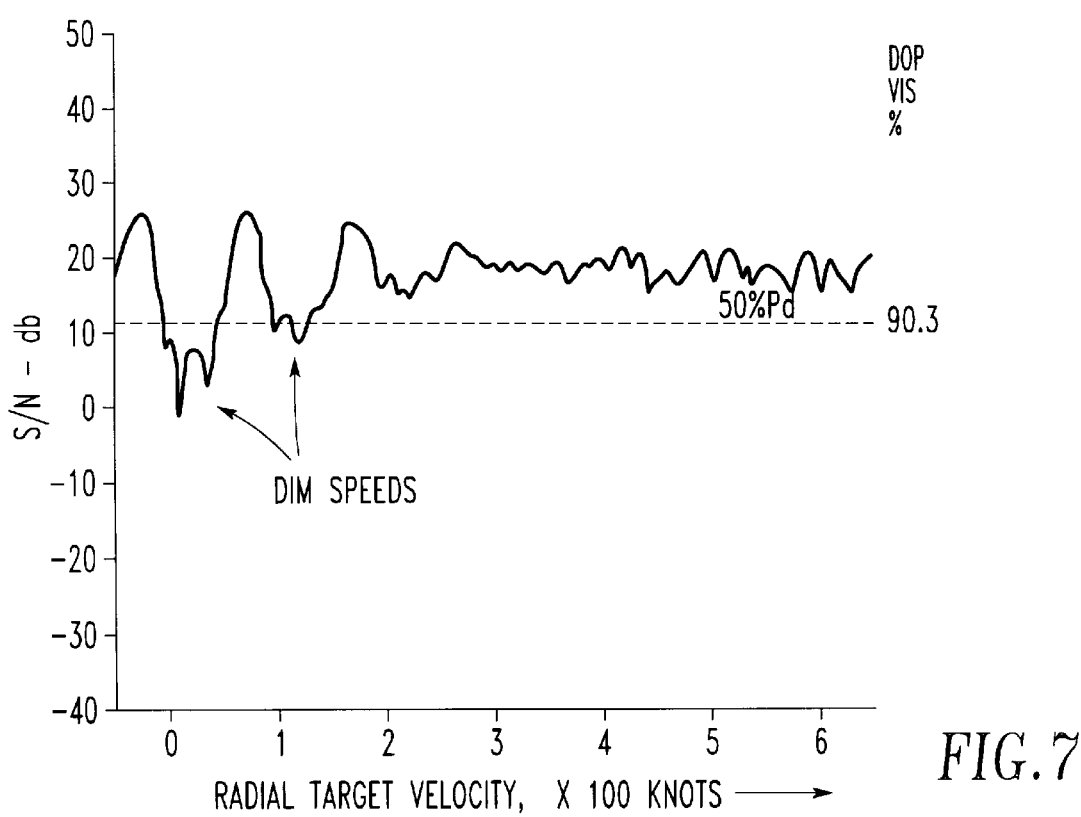
FIG. 7 provides a graphical representation of the target indication performance of an adaptive-MTI ATC radar system structured and operated in accordance with the invention when this radar system is illuminating the same clutter as that corresponding to FIG. 6.

From a general standpoint, the first filter stage scales the complex input signal by determining a multiplier coefficient which provides a best match with the complex signal delayed by one IPP, and subtracts the scaled input signal from the delayed input signal to form one complex output 108T (FIG. 5). Reversely, the delayed input signal is similarly scaled to the undelayed input signal and then subtracted from it to form a second complex output 106T. This cross-correlation computation procedure indicates how alike the two complex output signals are.

Figure 4:
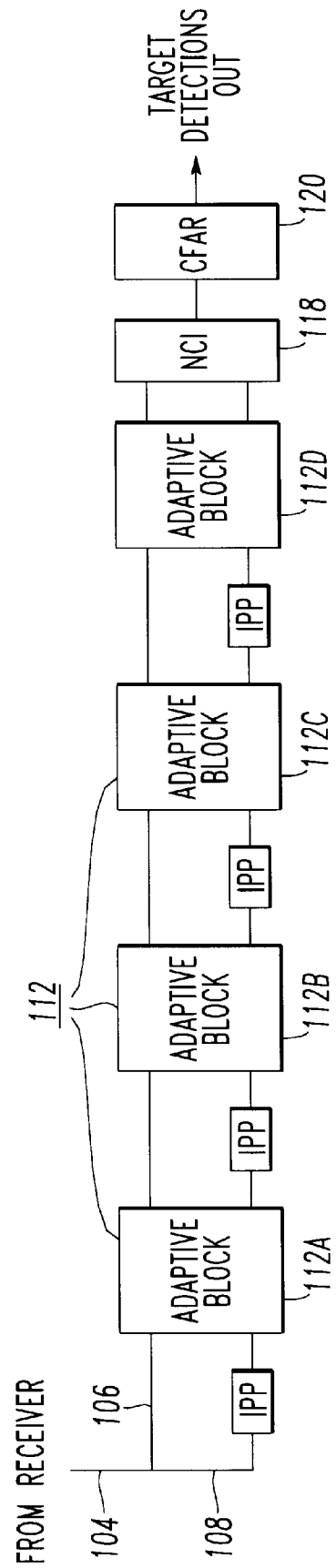
FIG. 4 is a functional block diagram illustrating the structure and operation of an adaptive lattice filter embodied in the digital signal processor of FIG. 3 and employing a plurality of adaptive blocks to generate aircraft or other moving target indication signals for further processing and display.

The two complex outputs 106T and 108T are applied to the next filter stage 112 where similar processing occurs. The subsequent filter stages also operate in the same manner thereby producing the final detected target signals for application to the NCI 118 (FIG. 4).

Clutter is reduced in each filter stage. Complex clutter (such as rain clutter plus ground clutter) normally requires more filter stages for clutter cancellation than does ground clutter alone.

The filter 102 cancels static and moving clutter by operating in conjunction with variable transmitter interpulse time periods (VIP) as enabled by the fact that each filter stage functions with two different scaling coefficients. The clutter attenuations in the upper and lower filter signal paths are different, in general, because of the VIP sequence and because of the difference in time delays (i.e., the signal path 108 has time delays whereas the signal path 106 does not). Since each of the upper and lower coefficients best cancels the clutter in its path, minimum clutter residue exists at the outputs of the upper and lower paths in each filter stage. The adaptive filter of the invention thus operates with flexibility in adapting to and cancelling moving clutter with a VIP sequence.

The adaptive filter block 112 is shown in greater detail in FIG. 5. In the filter lattice structure, each block 112 includes an upper computing chain, a lower computing chain 122, and a middle computing chain 124.

Respective elements including a delay 200, a subtractor 201, an adder 202, delays 203 and 204, and an adder 205 form a sliding window integrator (FIG. 9) in the computing chain 120. Similarly, elements 206 through 211 and elements 212 through 217 form respective sliding window integrators in the computing chains 124 and 122.

In the chain 120, the integrator computes an estimate of the power in the signal 106 by averaging over the sliding window interval. In the computing chain 124, the integrator computes an estimate of the average of the product of the signal 106 and the complex conjugate of the signal 108. The integrator in the third computing chain 122 computes an estimate of the power in the signal 108.

The lattice filter combines computed outputs from the three computing chains for application to dividers 150 and 152, as shown, to form respective adaptive filter coefficients. Multipliers 154 and 156 multiply the respective adaptive filter coefficients against delayed signals 108 and 106. Delay elements 218 and 219 align the signals 106 and 108, respectively, to the coefficient calculations so that the adaptive coefficients are applied to the cell of interest (FIG. 9).

The adaptive coefficients are applied to the signals 106 and 108 for optimal cancellation of these signals, respectively. Thus, the signal 106T is the signal 106 with all of the signal 108 removed by subtractor 107, which subtracts received adaptively modified output signal 123 from the delayed signal 106.

The reverse is true of the signal 108T. The subtractor 109 receives adaptively modified output signal 121 from the multiplier 154 to remove whatever portion of the signal 106 (averaged over the sliding windows) is present in the signal 108 and produce the signal 108T.

Accordingly, any signal present in both signals 106 and 108 over the sliding windows is removed. A target existing only in the cell of interest is not removed, but clutter, which may exist in many range gates, is removed.

With the use of multiple interchain divisional operations as described, the invention is enabled to function effectively in removing both static and moving clutter with the use of variable transmitter interpulse time periods.

Although the filter of the invention employs a basic lattice structure, it does so with the use of ensemble averaging to compute weights stage-by-stage with averaging in range only. In addition, forward and backward reflection coefficients are computed independently, and these coefficients are not restricted to being complex conjugates.

For additional detail on the operation of the adaptive filter blocks 112, reference is made to APPENDIX D.

FIGS. 11A–11K graphically illustrate the improved radar operating results achieved with use of the invention as demonstrated by computer simulations.

Reference is made to APPENDIX C for a more detailed explanation of the operating results as graphically illustrated.

In summary, a pulse radar system of the invention is structured and operated to provide features including the following:

Rapid and low cost update of filter coefficients so that varying clutter spectrums can be dealt with.

Complete insensitivity to average clutter motion; only the spectral width of the clutter is significant.

Insensitivity to transmitter phase and gain noise.

Variable transmission interpulse periods are unambiguous in range.

Numerical stability.

Filter adaptation to and whitening of the actual clutter spectrum, not some model spectrum that may be quite inaccurate.

Use of range averaging to estimate each filter coefficient.

Independent computation of the forward and reverse reflection coefficients.

APPENDIX A—Limits of Prior Art

Figure 10A:
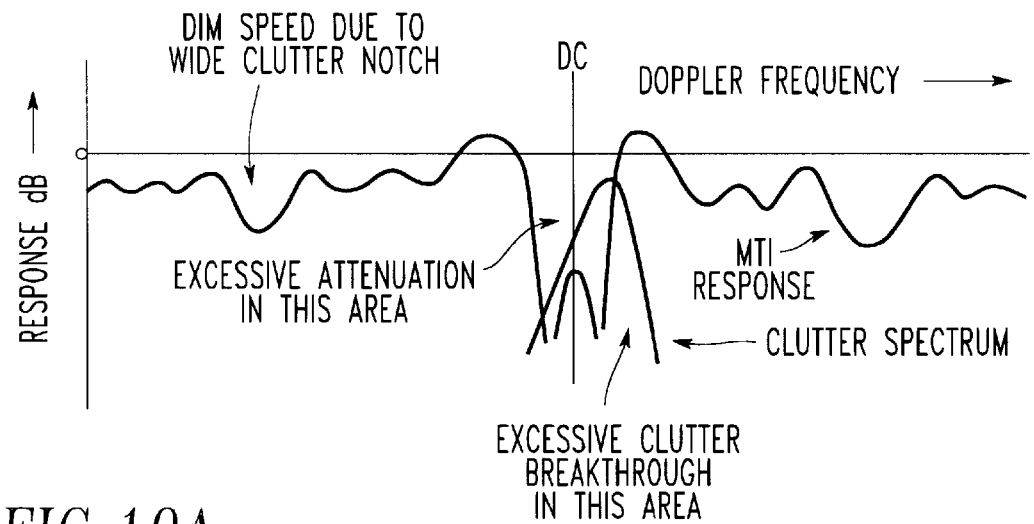
FIGS. 10A–10C graphically illustrate the limited target detection performance of the MTI and MTD prior art.

Existing pulse radars use a variety of means for separating targets from clutter and noise. Methods, such as MTI, use high pass filters consisting of one or more zeroes to filter out the clutter based on its spectral characteristics. Zero locations are normally fixed at design time for optimal removal of a specific type of clutter or a specific group of clutter types. The only adaptivity provided normally consists of CFAR detection which allows the detection threshold to ride above the noise plus residue clutter level. Thus, if the actual clutter spectrum differs from that originally assumed when designing the filter, system degradation will occur. The degradation may result from clutter outside of the notch not being removed or from excessive attenuation of desired signals due to a clutter notch that is too wide or from a combination of these two effects. (FIG. 10A).

Figure 10B:
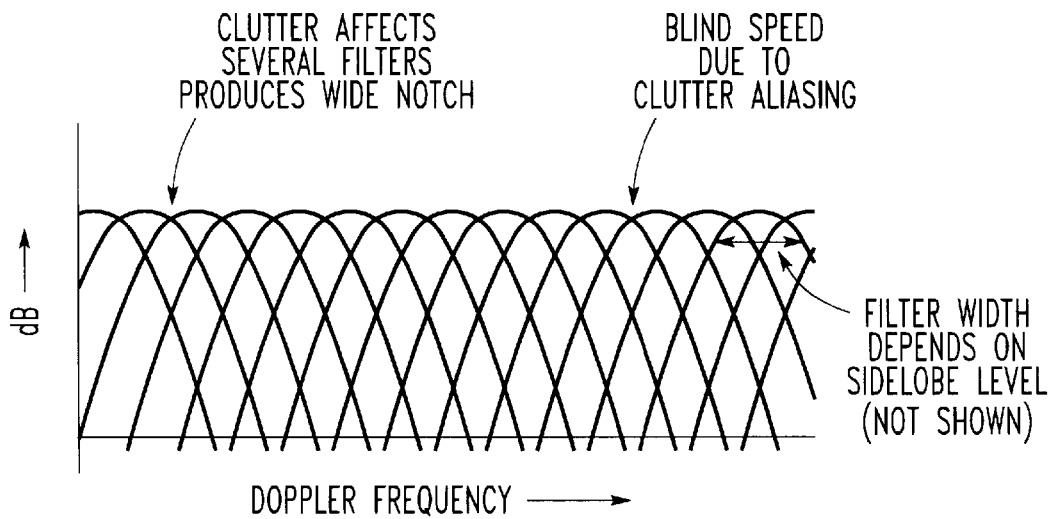

Doppler filter banks have been applied to the problem of clutter rejection and provide a slight increase in filter adaptivity by allowing the use of independent CFAR detectors on each filter output. Thus, the filter response can be varied somewhat to match the clutter characteristics. Again, however, the actual filter shapes must be specified in advance and are optimum for only the clutter model chosen at design time, not the clutter actually seen. Further, parameters such as sidelobe level and mainlobe width and position must be set at design time (FIG. 10B).

Figure 10C:
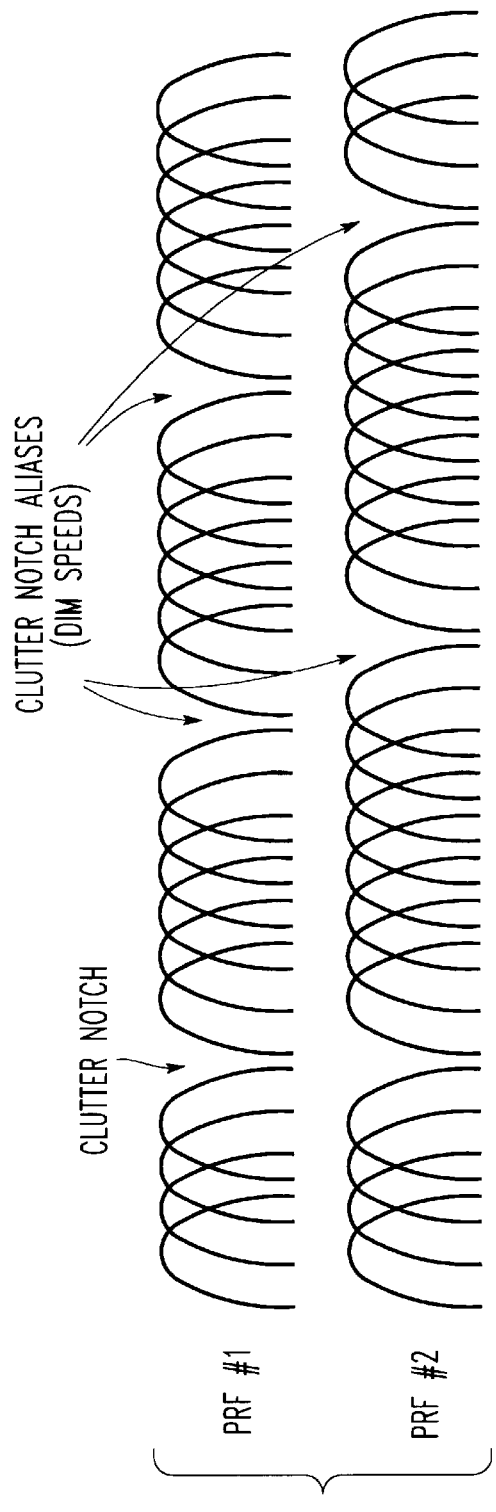

A further disadvantage of most filter banks is that they are suitable for use only with a constant PRF radar. Thus, the clutter rejection regions formed by the filter bank are replicated at multiples of the PRF. This fact usually implies that several observation bursts, each with a different PRF or carrier frequency, must be used for each search resolution cell in order to fill in blind speeds. (FIG. 10C). These bursts must be combined noncoherently; and thus the additional observation time implied by multiple bursts do not translate into improved spectral or cross range resolution.

APPENDIX B—Transmitter Instabilities

An MTI filter normally produces one or more zeroes in its z-plane that are designed to minimize the response to a clutter spectrum. Transmitter instabilities tend to cause the clutter spectrum to wander about from pulse to pulse and thus no longer fall within the notch created by the MTI filter. The filter of the invention provides a movable zero which is unaffected by transmitter instabilities. This zero automatically moves on a PRT by PRT basis for optimal removal of the clutter. That is, the movable zero tends to follow the "center of gravity" of the clutter spectrum and thus remove as much clutter energy as is possible with a single zero filter. This adaptive filter may be followed by additional stages of filtering (adaptive or not) to provide filter response shaping and to obtain even better clutter rejection.

The value of the filter coefficient is selected to minimize the clutter to noise ratio at the filter output and is computed from the well known equation:

$$K = -\frac{\langle V(t)V^*(t-T)\rangle}{\langle |v(T-t)|2\rangle}$$

Where < > means expected value and T is the interpulse period.

The statistical estimates, $\langle V(t)\cdot V^*(t-T)\rangle$ and $\langle |V(t-T)|^2\rangle$, are obtained by performing the indicated products for a number of range cells and then averaging the results. The ratio K, is then formed from these estimates.

The number of range cells to average over must be selected by the designer of the particular radar but typically is in the range 10 to 100. Ideally, the whole IPP would be integrated together to form these estimates although there are advantages to integrating over shorter times:

Less arithmetic work is required.

If K is allowed to vary as a function of range, then the "moving zero" can be made to cancel moving clutter.

Also stalo noise can be reduced if K is allowed to vary as a function of range. Noise near the carrier will be reduced when the frequency difference is less than the integration time of the factors of K.

The amount that the MTI improvement factor can be improved depends on many things including the clutter model used, the transmitter instability, and the antenna scanning modulation. However, with reasonable assumptions, a 10 to 30 dB improvement in clutter cancellation can be attained if transmitter instability were the limiting factor.

APPENDIX C—Computer Simulations of Invention

Extensive computer simulations of this lattice structure have been run that demonstrate the effectiveness of this invention. A few results are presented here.

In FIGS. 11A–11K, each graph shows a number of filter responses as a function of doppler. DC doppler is on the left hand end of each graph with doppler increasing to the right. The vertical axis is dB response. The straight, horizontal line represents the output of the filter after a single PRT of data. Successive curves, moving generally upward represent the output after successive PRT's have been received.

In each case, the lattice filter consists of eight stages while sixteen curves are plotted. Curves after the eighth show a steady state response. The curves are plotted before post detection integration and thus individually have more ripple than some other representations which show average response.

Each curve set is generated by applying modeled clutter to the filter, letting the filter operate to whiten the clutter, and then measure the resulting adaptive frequency response. The clutter model is created by a suitable generator, such as that shown in FIG. 12.

Figure 11A:
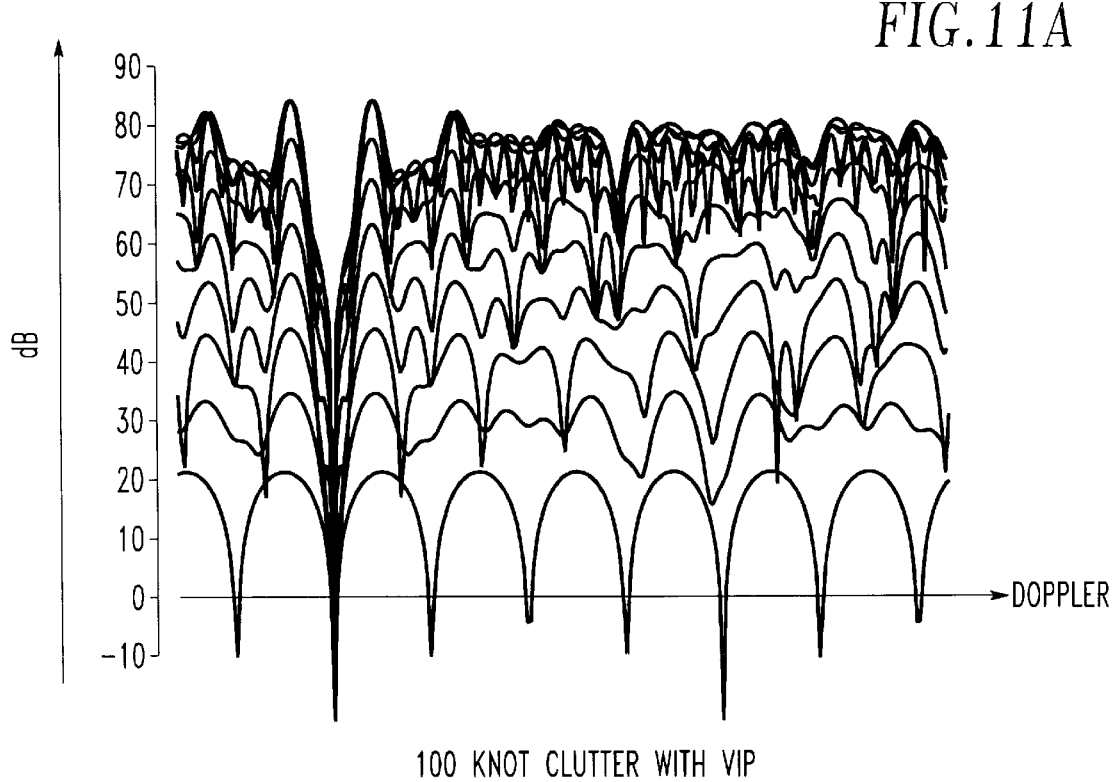
FIGS. 11A–11K graphically illustrate performance results of the invention as obtained through computer simulation procedures.

FIG. 11A shows a test of the lattice filter with narrow band moving clutter. The speed is well above the unambiguous doppler extent. The speed shown would correspond to 100 knots for an 80 mile, S-band radar. The clutter is formed by the generator in FIG. 12, with C=0.9 and the FIR filter placing twelve zeroes at Z=1 (binomial weighing). The second FIR filter is set to zero output.

The lattice filter successfully found the clutter and placed a high order notch on it. The VIP sequence, 29:37:31:41:34, provided blind speed fill-in outside the unambiguous doppler extent. Over 70 dB of moving clutter rejection was attained with the eight stage filter with very good VIP fill-in.

Figure 11B:
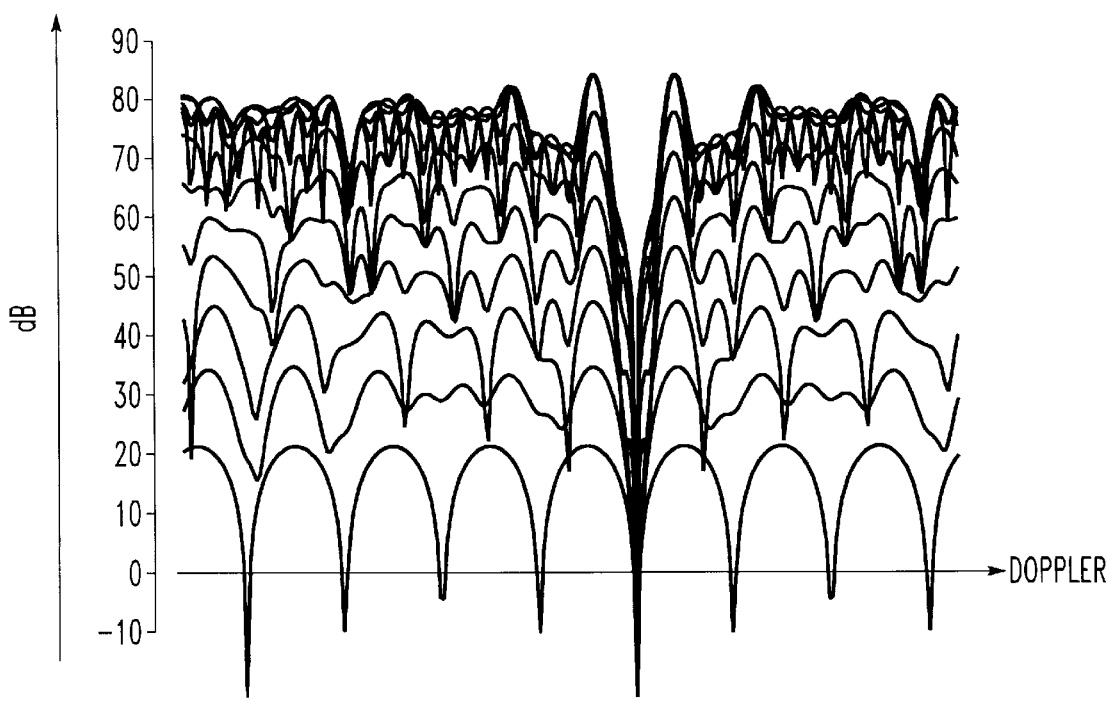

FIG. 11B shows what happens if the clutter moves instead at 300 knots; the curves only shift to the right.

Figure 11C:
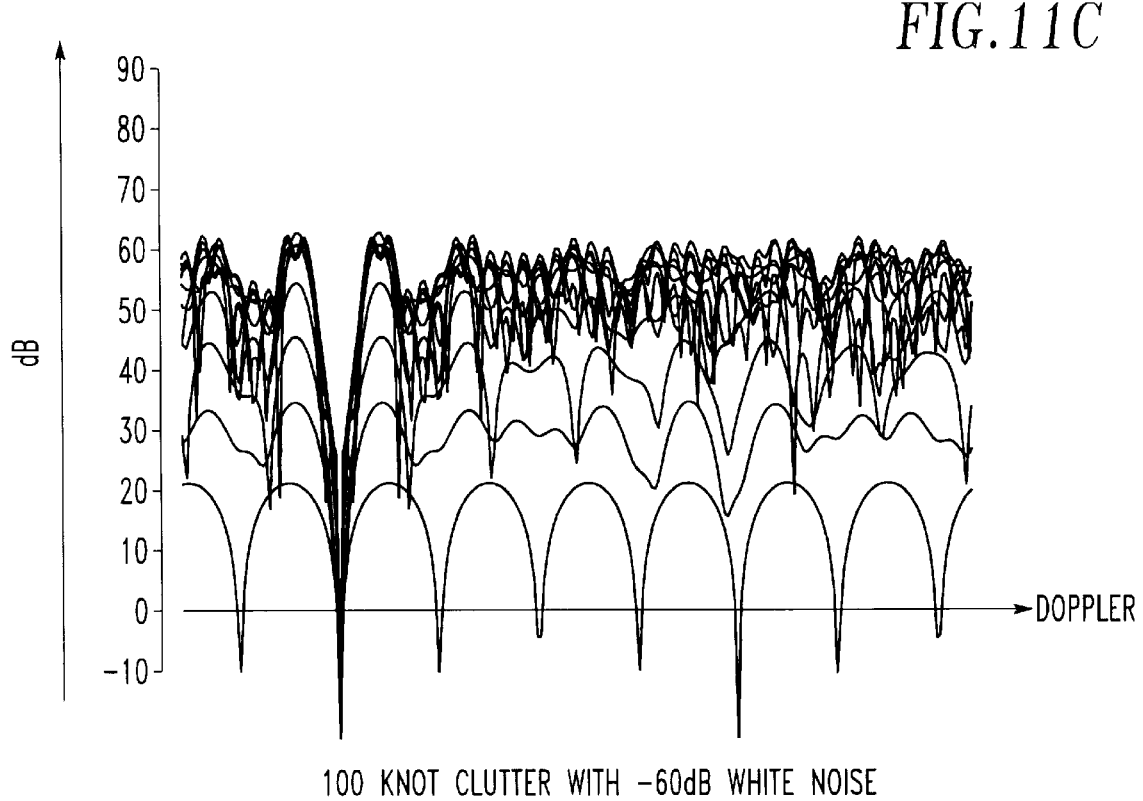

FIG. 11C adds white noise 60 dB down to the 100 knot clutter. The optimum six pulse canceller is as good as can be done for this clutter and noise model.

Figure 11D:
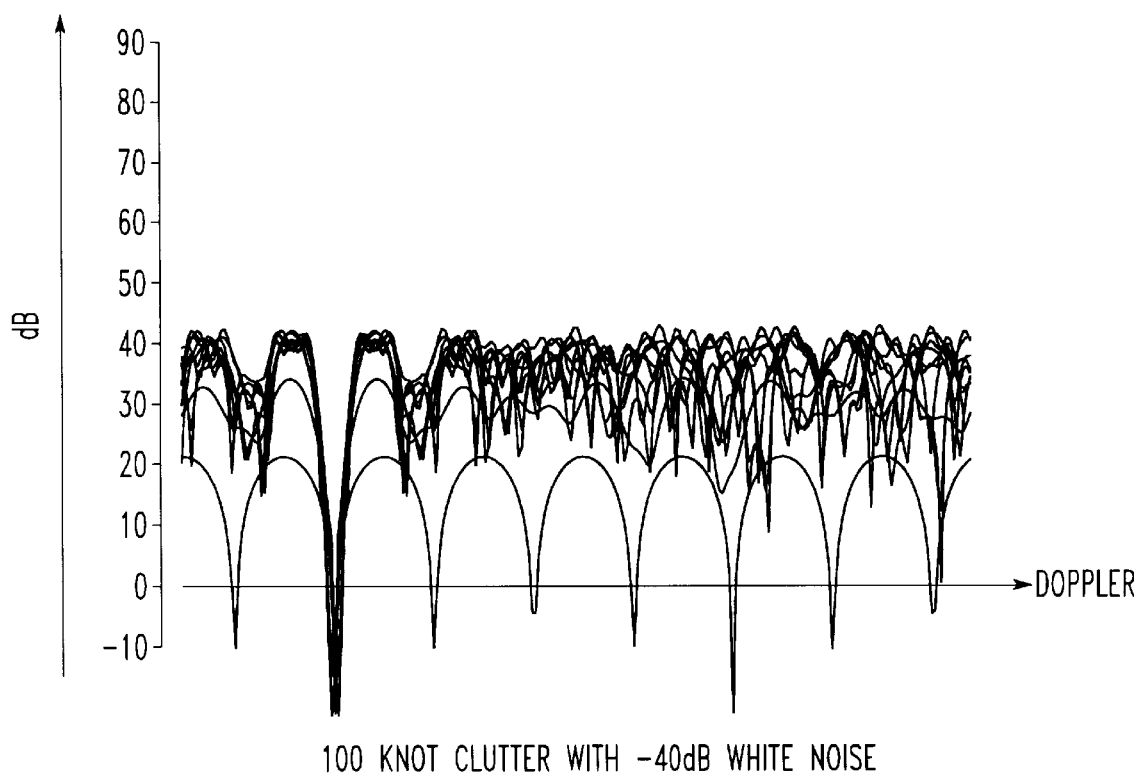

FIG. 11D increases the noise to −40 dB. Here, the optimum four pulse canceller is best.

Figure 11E:
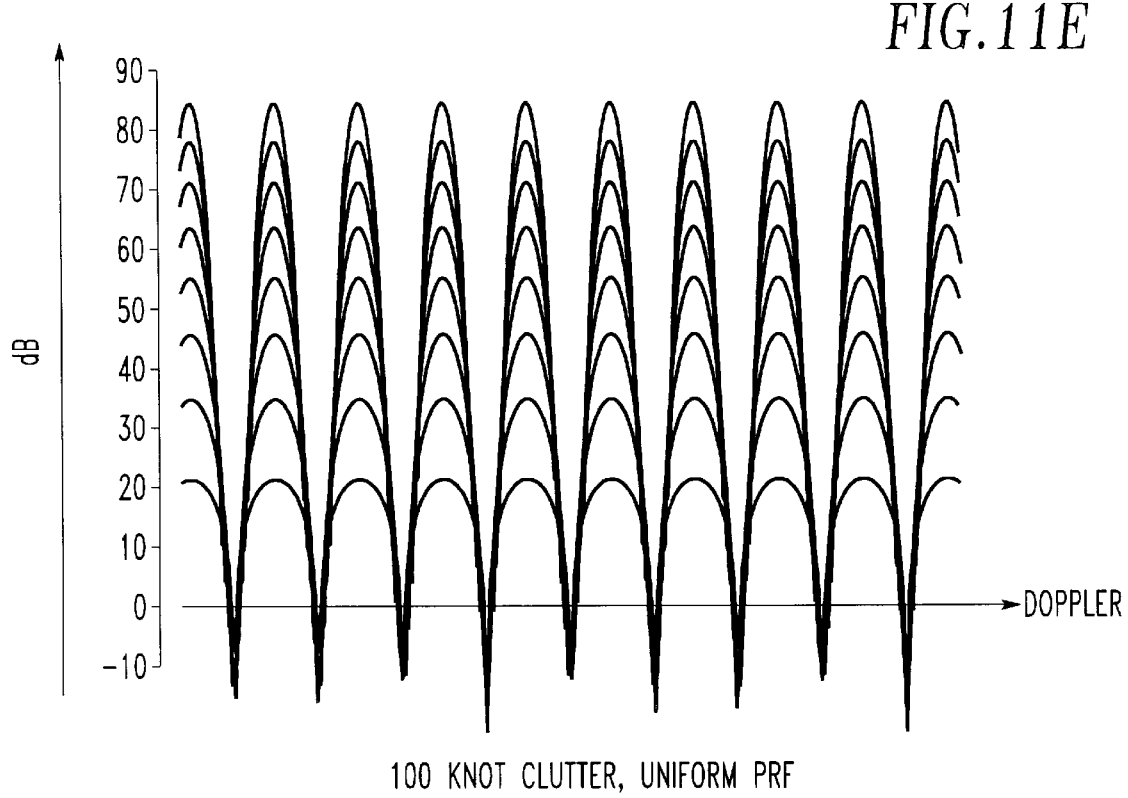
Figure 11F:
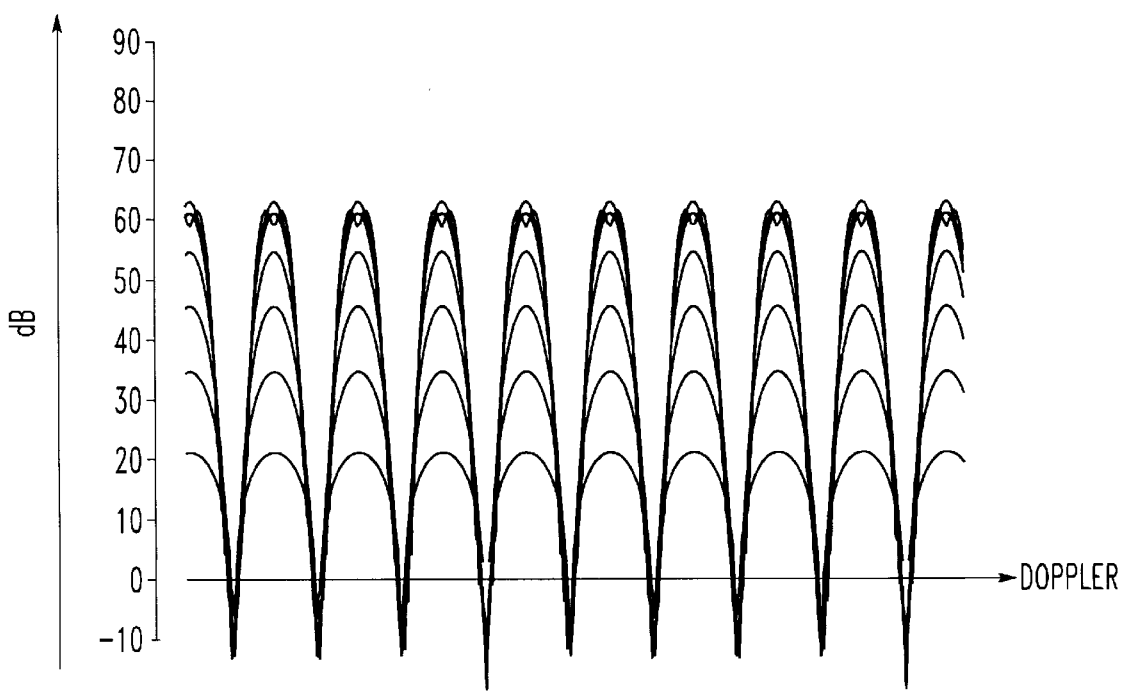
Figure 11G:
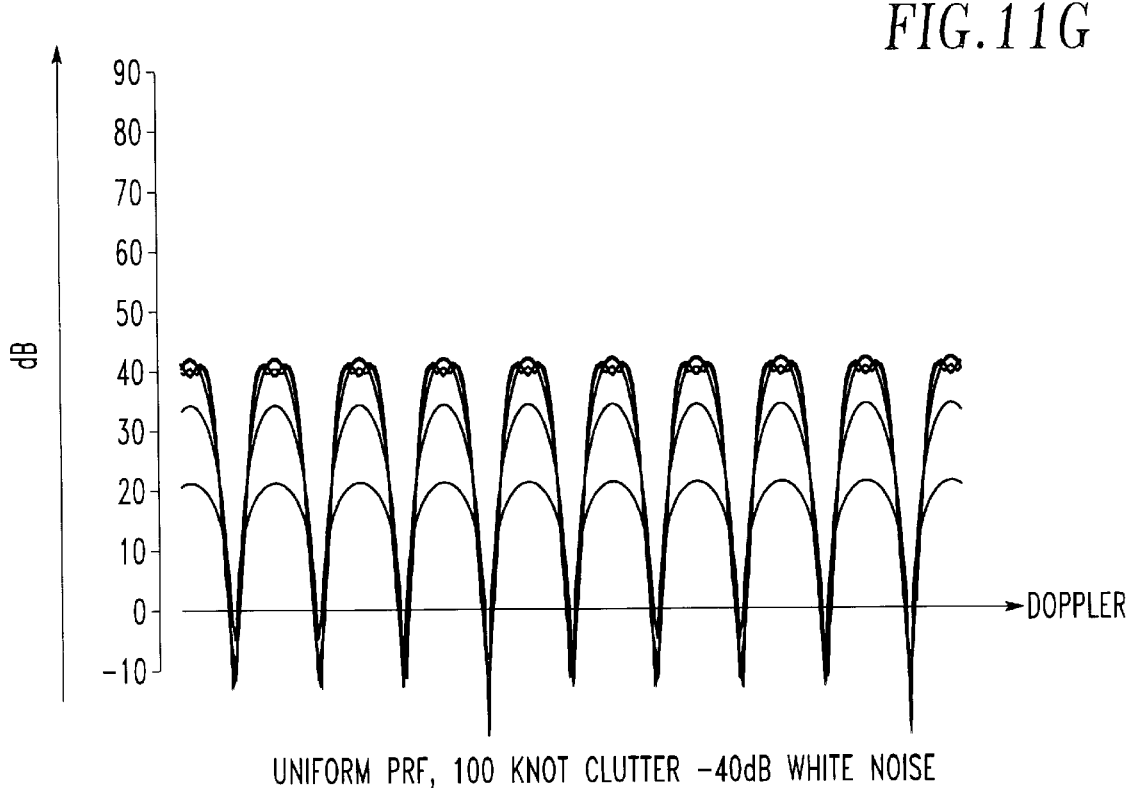

FIGS. 11E–11G shows the filter driven with a uniform PRF with varying degrees of noise. The clutter improvement factor is no better than that achieved with the VIP sequences but blind speeds ruin the uniform PRF filter response.

Figure 11H:
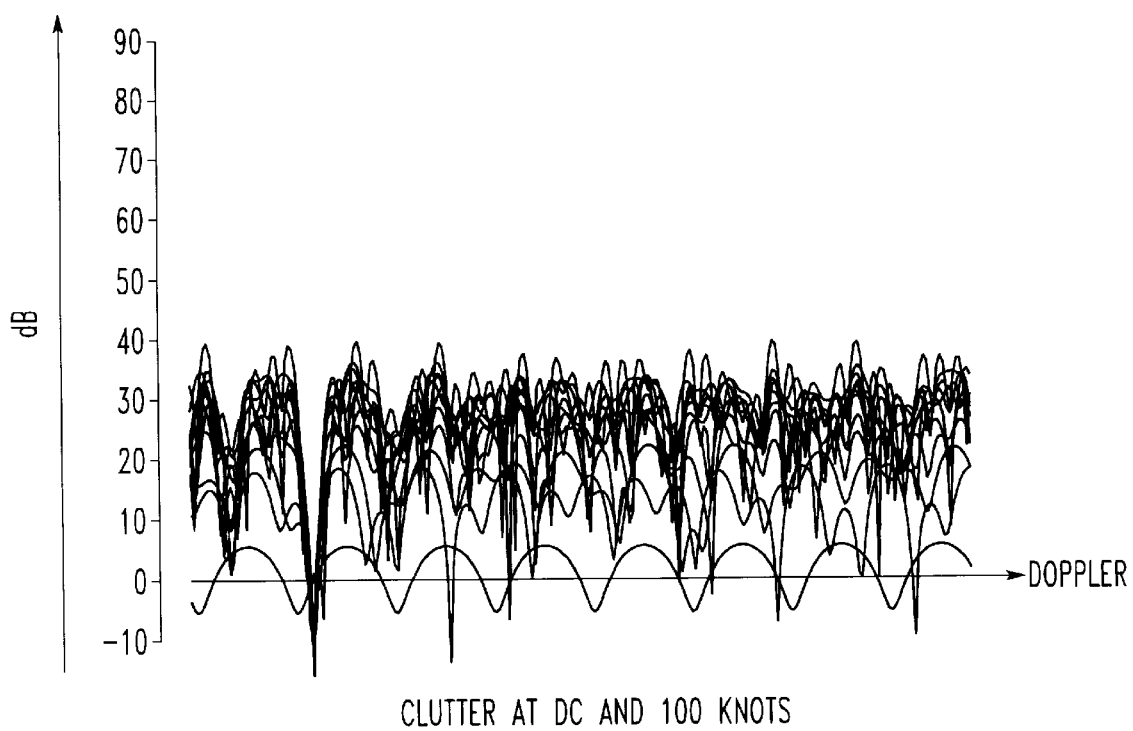
Figure 11I:
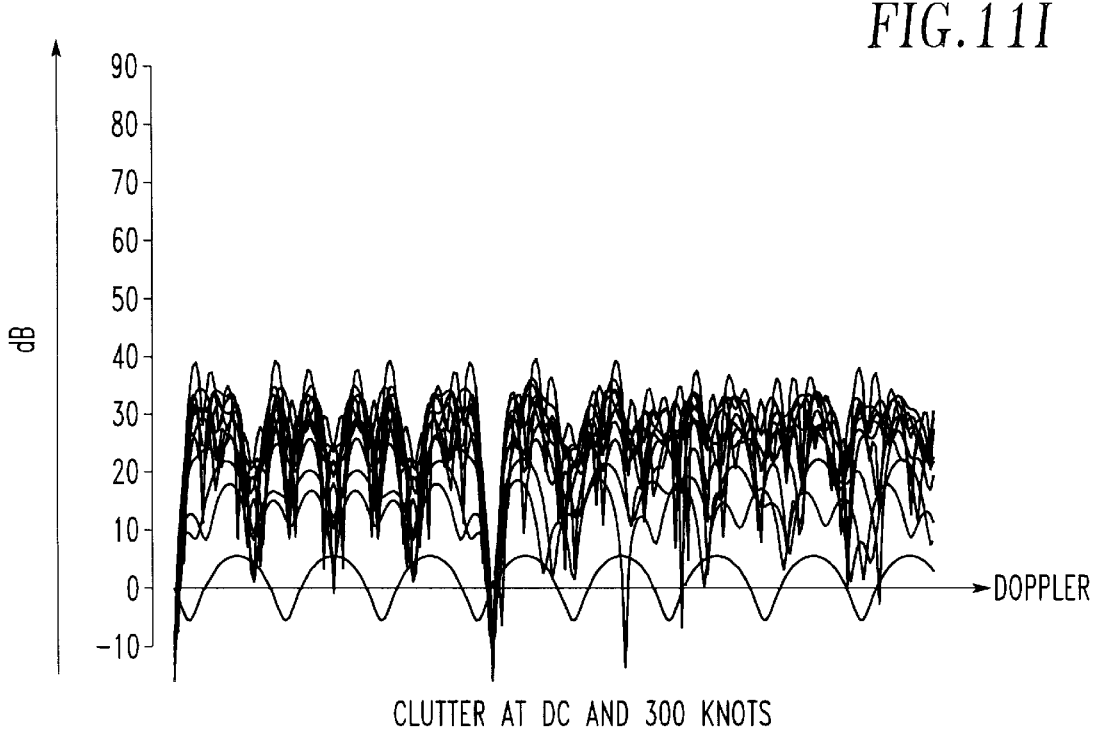

FIGS. 11H and 11I show two clutter sources superimposed. Clutter at DC and clutter at 100 and 300 knots respectively. While there are a few dim speeds, VIP provides quite a bit of fill-in. There is substantially less MTI improvement in these curves because there is no low noise "window" being moved around by VIP to provide the doppler fill-in.

Figure 12:
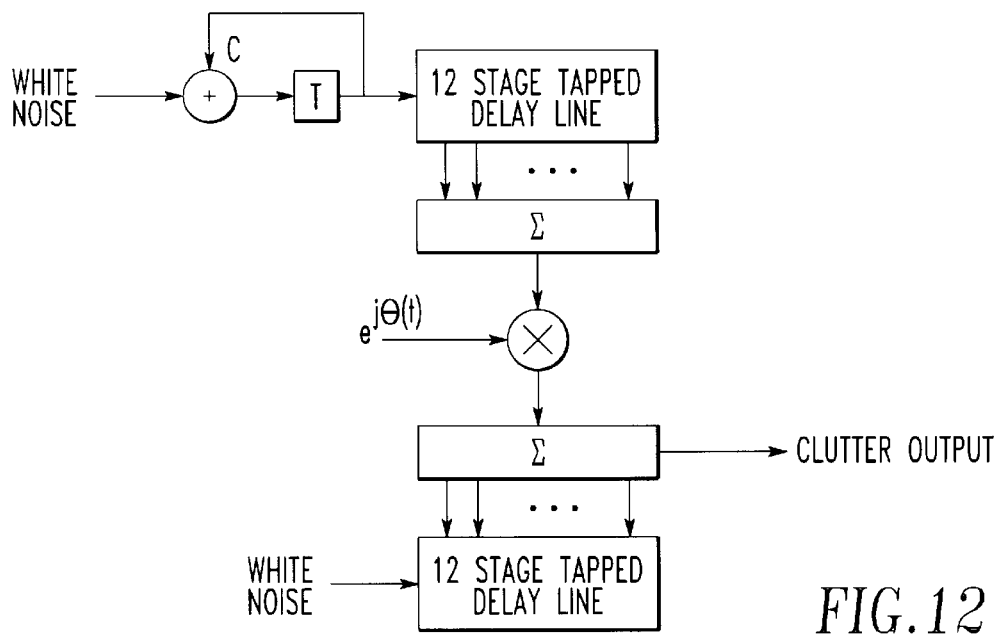
FIG. 12 represents a clutter generator model used in computer simulations.
Figure 11J:
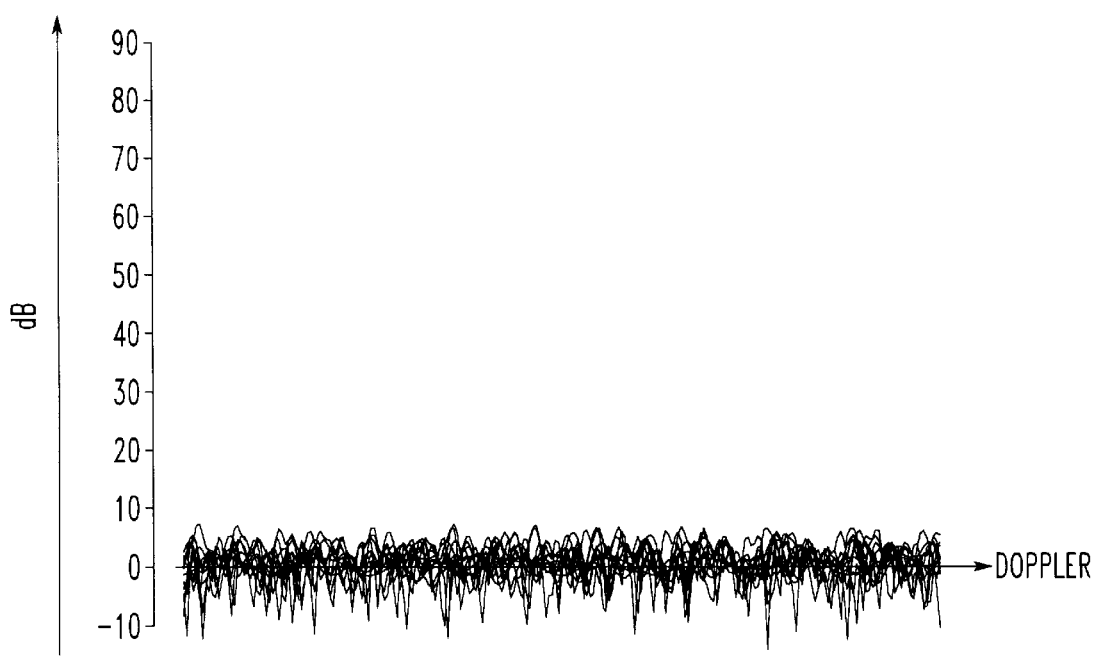

FIG. 11J demonstrates the filter performance against transmitter instabilities. Here the phase of the FIR filter of FIG. 12 is reversed every PRT. Although no deep notch is formed (at least within the doppler range of interest) similar MTI improvement can be attained as can be seen by comparing FIG. 11J with FIG. 11A. The lower clutter residue in FIG. 11J, as evidenced by the higher general level of each curve, is because the FIR filter is a band stop filter and the IIR filter is a bandpass filter. If the IIR filter also has been modified to alternate phase each PRT, the range of the curves in FIG. 11J would match that in FIG. 11A.

Figure 11K:
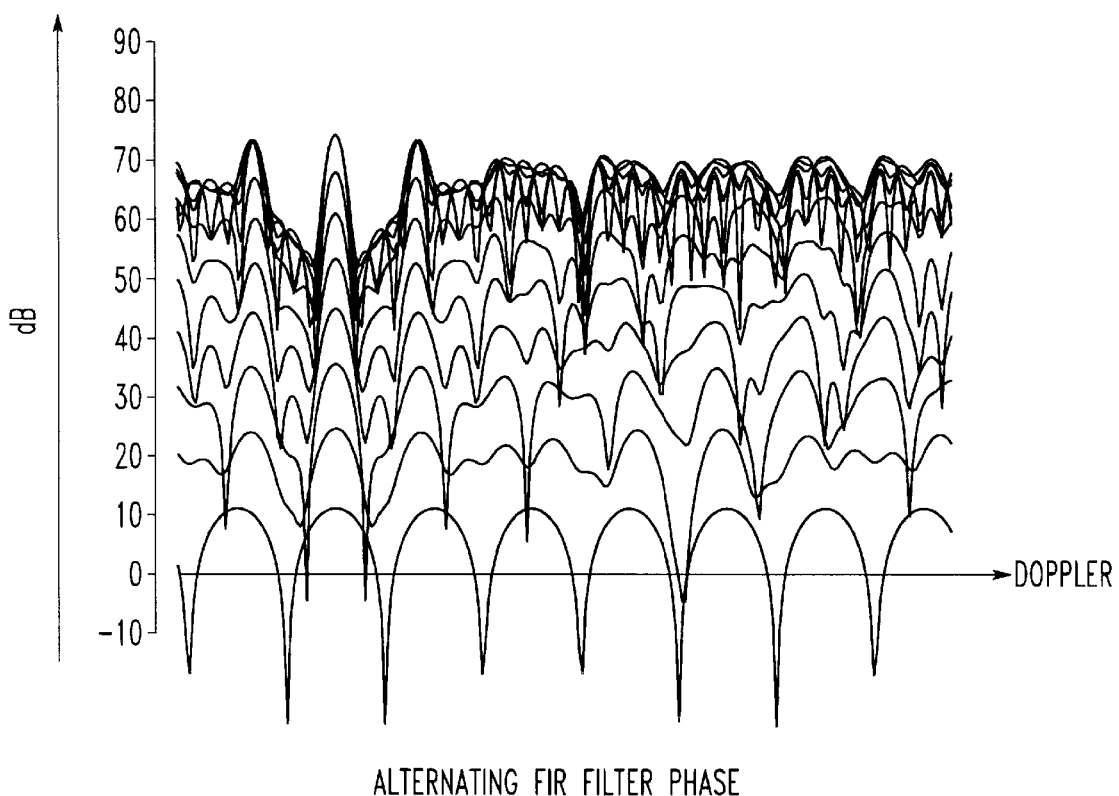

Finally, FIG. 11K shows the filter response after having adapted to white noise. No improvement against white noise is possible for a noise whitening filter. The small improvement that could be attained through the use of coherent integration techniques would necessitate the use of a uniform PRF, with the attendant problems noted previously.

APPENDIX D—Adaptive Filter Blocks

The coefficients are calculated from the well known formulas:

$$P_i = 1 - \frac{\langle V'_{Ri}{}^* \cdot V_{Fi}\rangle}{\langle |V_{Ri}|^2\rangle}$$

and $$q_i = 2 - \frac{\langle V'_{Fi}{}^* \cdot V_{Ri}\rangle}{\langle |V_{Fi}|^2\rangle}$$

where * means complex conjugation and < > means expected value.

+See for example: Ahmed, N. and Fogler, R. J., "On An adaptive Lattice Predictor and a Related Application", IEEE Circuits and Systems Magazine, Vol. 1, No. 4, pp 19–23.

The ensemble averaging that is used to estimate the expected value can be accomplished with several types of range ordered filters:

Decaying exponential filter:

$$A_i = A_i + R^*(V'_{Ri}{}^* V_{Fi} - A_1)$$

where:

=means replace $A_i$ is the current estimate of the statistical parameter, in this case $\langle V_{Ri}{}^* V_{Fi}\rangle$ and R is a factor controlling the time constant of the filter.

Sliding window filter where the statistical averages are accomplished using an FIR filter whose impulse response straddles the cell of interest Other recursive filters which again would take as input data from range cells somewhat in advance of the current range cell so that the impulse response straddles the cell of interest.

In any event, the filtering must be performed separately on the numerators and denominators of the fractions given in equations 1 and 2; and the filtering must be the same for each quantity.

The output of the lattice filter contains only unpredictable data: white noise, whitened clutter residue and targets.* Non-coherent integration is applied to the normalized output of the lattice filter. The filter operates as follows:

1) The first PRT of a data set enters the lattice filter. Since this is new data, a new frequency or a new look direction, there is no correlation with any data within the filter and all p's and q's are zero. The filter output, which in this case is the same as the input, is detected and normalized in amplitude using well known CFAR techniques. this normalized output is fed into an integrator.

2) The second PRT that enters the lattice filter correlates only with the previous pulse. Thus only $p_1$ and $q_1$ are non-zero, and are found by computing the degree of correlation between the first and second PRT averaged over a sliding range window function. The filter forms the optimum two pulse canceller. The output of the filter is again detected, normalized and fed to the integrator.

3) The third PRT causes $p_1$, $q_1$, $p_2$ and $q_2$ to be non zero; the optimum three pulse canceller is formed. Notice that $p_1$ and $q_1$ are unrelated to their previous values when only two pulses were present in the filter.

4) All succeeding PRT's proceed in a similar manner until the first PRT runs off the end of the lattice. The effective length of the filter then ceases to grow and we are left with the optimum N-pulse canceller, where 'N' is one more than the number of filter delay elements.

It is well known that successive outputs of the lattice filter are statistically orthogonal until the filter fills. After this point, approximate orthogonality is maintained. Thus the clutter residue has been whitened and filter output is suitable for non-coherent integration.

Another way of explaining the filter is as follows: Each new PRT is predicted from the past N PRT's stored within the lattice filter and the predicted value is subtracted from the input (the architecture is simply an efficient way to do this). Thus what emerges from the filter is that which is unpredictable, as was stated previously. If a phase shift had been applied to the incoming PRT, due, for exaple, to transmitter instabilities, then the filter rotates the stored data as necessary to match this phase shift and predict the data just as well as before. Gain instabilities are handled in much the same way. Thus transmitter instabilities are effectively removed from the incoming data stream.

Previous lattice filter implementations required that the input data statistics be Toeplitz or shift invariant, which are terms meaning that the clutter is statistically stationary. This new implementation removes this limitation as the previous discussion indicates and allows the use of variable interpulse period (VIP) illumination patterns.

The foregoing description of the preferred embodiment has been presented to illustrate the invention without intent to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A pulse radar system comprising:

an antenna system for transmitting and receiving radio frequency signals;

a transmitter for generating successive transmit pulses coupled to the antenna system for radiation to a field of illumination defined by operation of the antenna system;

a control system varying lengths of successive interpulse periods (IPPs) between the successive transmit pulses in accordance with a pattern thereby enabling the radar system to avoid false rejections of moving targets;

a receiver for converting a composite, analog radio frequency signal received from the antenna system to a baseband video signal comprising a stream of digital data having combined in-phase and quadrature components; the digital data stream formed by successive range gates generated at a set sampling rate and representing information content in the radio frequency signal including target information and stationary and moving clutter information;

a target detecting system synchronized with the transmitter by the control system;

the target detecting system processing each range gate in a group of range gates including successive range gates preceding the range gate being processed and successive range gates subsequent to the range gate being processed to determine signal characteristics present in a preponderance of the range gates in the group as being unwanted; the target detecting system adaptively cancelling unwanted signal characteristics thereby generating range gates which contain target information as digital target signals containing little or no residue of stationary or moving clutter; and a system for processing and displaying the target signals.

2. The radar system of claim 1 adapted to operate as a moving target indicator (MTI) radar system for airport traffic control wherein the antenna system operates with 360 degree scanning and the targets include aircraft.

3. The radar system of claim 2 wherein a mechanical drive rotates the antenna system to produce the 360 degree scanning.

4. The radar system of claim 1 wherein the target detecting system includes a lattice filter structured to cancel signal characteristics as defined and to generate the digital target signals.

5. The radar system of claim 2 wherein the target detecting system includes a lattice filter structured to cancel signal characteristics as defined and to generate the digital target signals.

6. The radar system of claim 4 wherein the target detection system includes a digital signal processor in which the lattice filter is embodied as a software structure.

7. The radar system of claim 4 wherein the lattice filter includes a plurality of adaptive filter blocks connected in tandem, each block operates to cancel signal characteristics as defined so that the lattice filter provides progressively increasing clutter cancellation for each successive range gate processed through the filter blocks, and the digital target signals are output by a last one of the filter blocks.

8. The radar system of claim 7 adapted to operate as a moving target indicator (MTI) radar system for airport traffic control wherein the antenna system operates with 360 degree scanning and the targets include aircraft.

9. The radar system of claim 4 wherein:

the lattice filter includes at least one adaptive filter block having an upper line to which incoming range gates are applied and a lower line to which incoming range gates are applied with an IPP time delay;

the adaptive block includes upper, middle, and lower computing chains having respective sliding window integrators; each sliding window integrator having an adaptive window of N range gates;

incoming range gates on the upper line are coupled to an input of the upper computing chain;

incoming IPP delayed range gates on the lower line are coupled to an input of the lower computing chain;

incoming range gates on the upper line and the conjugate of incoming IPP delayed range gates on the lower line are coupled to an input of the middle computing chain;

an upper computing link generates an upper adaptive coefficient from outputs generated for each range gate by the upper and middle computing chains, and multiplies the upper adaptive coefficient against a corresponding time delayed range gate on the upper line to generate a first adaptively modified output;

a lower computing link generates a lower adaptive coefficient from outputs generated for each range gate by the lower and middle computing chains, and multiplies the lower adaptive coefficient against a corresponding further time delayed range gate on the lower line to generate a second adaptively modified output;

an upper subtractor subtracts the second adaptively modified output from the time delayed range gate on the upper line to produce an upper output range gate with cancelled clutter; and a lower subtractor subtracts the first adaptively modified output from the further time delayed range gate on the lower line to produce a lower output range gate with cancelled clutter delayed by an IPP from the upper output range gate.

10. A pulse radar system comprising:

an antenna system for transmitting and receiving radio frequency signals;

a transmitter for generating, from a carrier waveform, successive transmit pulses coupled to the antenna system for radiation to a field of illumination defined by operation of the antenna system; the transmitter characterized with a degree of instability causing some variation in carrier phase for transmitted pulses;

a control system varying lengths of successive interpulse periods (IPPs) between the successive transmit pulses in accordance with a pattern thereby enabling the radar system to avoid false rejections of moving targets;

a receiver for converting a composite, analog radio frequency signal received from the antenna system to a baseband video signal comprising a stream of digital data having combined in-phase and quadrature components; the digital data stream formed by successive range gates generated at a set sampling rate and representing information content in the radio frequency signal including target information and stationary and moving clutter information;

a target detecting system synchronized with the transmitter by the control system;

the target detecting system processing each range gate in a group of range gates including successive range gates preceding the range gate being processed and successive range gates subsequent to the range gate being processed to determine signal characteristics present in a preponderance of range gates in the group as being unwanted; the target detecting system adaptively cancelling unwanted signal characteristics thereby generating digital target signals containing little or no residue of stationary or moving clutter and containing substantially no effects from variations in carrier phase for the transmit pulses; and a system for processing and displaying the target signals.

11. The radar system of claim 10 adapted to operate as a moving target indicator (MTI) radar system for airport traffic control wherein the antenna system operates with 360 degree scanning and the targets include aircraft.

12. The radar system of claim 11 wherein the target detecting system includes a lattice filter structured to cancel signal characteristics as defined and to generate the digital target signals.

13. The radar system of claim 12 wherein:
the lattice filter includes at least one adaptive filter block having an upper line to which incoming range gates are applied and a lower line to which incoming range gates are applied with an IPP time delay;
the adaptive block includes upper, middle, and lower computing chains having respective sliding window integrators; each sliding window integrator having an adaptive window of N range gates;
incoming range gates on the upper line are coupled to an input of the upper computing chain;
incoming IPP delayed range gates on the lower line are coupled to an input of the lower computing chain;
incoming range gates on the upper line and the conjugate of incoming IPP delayed range gates on the lower line are coupled to an input of the middle computing chain;
an upper computing link generates an upper adaptive coefficient from outputs generated for each range gate by the upper and middle computing chains, and multiplies the upper adaptive coefficient against a corresponding time delayed range gate on the upper line to generate a first adaptively modified output;
a lower computing link generates a lower adaptive coefficient from outputs generated for each range gate by the lower and middle computing chains, and multiplies the lower adaptive coefficient against a corresponding further time delayed range gate on the lower line to generate a second adaptively modified output;
an upper subtractor subtracts the second adaptively modified output from the time delayed range gate on the upper line to produce an upper output range gate with cancelled clutter and without effects from transmitter instability; and
a lower subtractor subtracts the first adaptively modified output from the further time delayed range gate on the lower line to produce a lower output range gate with cancelled clutter delayed by an IPP from the upper output range gate.

14. A pulse radar system comprising:
means for transmitting and receiving radio frequency signals;
means for generating successive transmit pulses coupled to the antenna system for radiation to a field of illumination defined by operation of the antenna system;
means for varying lengths of successive interpulse periods (IPPs) between the successive transmit pulses in accordance with a pattern thereby enabling the radar system to avoid false rejections of moving targets;
means for converting a composite, analog radio frequency signal received from the antenna system to a baseband video signal comprising a stream of digital data having combined in-phase and quadrature components; the digital data stream formed by successive range gates generated at a set sampling rate and representing information content in the radio frequency signal including target information and stationary and moving clutter information;
first means for processing each range gate in a group of range gates including successive range gates preceding the range gate being processed and successive range gates subsequent to the range gate being processed to determine signal characteristics present in a preponderance of the range gates in the group as being unwanted; the first means adaptively cancelling unwanted signal characteristics thereby generating range gates which contain target information as digital target signals containing little or no residue of stationary or moving clutter;
means for synchronizing operation of the first processing means with operation of the transmit pulse generating means; and
means for processing and displaying the target signals.

15. The radar system of claim 14 wherein the first processing means includes a lattice filter structured to cancel signal characteristics as defined and to generate the digital target signals.

16. The radar system of claim 15 wherein the first processing means includes a digital signal processor in which the lattice filter is embodied as a software structure.

17. The radar system of claim 16 wherein:
the lattice filter includes at least one adaptive filter block having an upper line to which incoming range gates are applied and a lower line to which incoming range gates are applied with an IPP time delay;
the adaptive block includes upper, middle, and lower computing chains having respective sliding window integrators; each sliding window integrator having an adaptive window of N range gates;
incoming range gates on the upper line are coupled to an input of the upper computing chain;
incoming IPP delayed range gates on the lower line are coupled to an input of the lower computing chain;
incoming range gates on the upper line and the conjugate of incoming IPP delayed range gates on the lower line are coupled to an input of the middle computing chain;
an upper computing link generates an upper adaptive coefficient from outputs generated for each range gate by the upper and middle computing chains, and multiplies the upper adaptive coefficient against a corresponding time delayed range gate on the upper line to generate a first adaptively modified output;
a lower computing link generates a lower adaptive coefficient from outputs generated for each range gate by the lower and middle computing chains, and multiplies the lower adaptive coefficient against a corresponding further time delayed range gate on the lower line to generate a second adaptively modified output;
an upper subtractor subtracts the second adaptively modified output from the time delayed range gate on the upper line to produce an upper output range gate with cancelled clutter; and
a lower subtractor subtracts the first adaptively modified output from the further time delayed range gate on the lower line to produce a lower output range gate with cancelled clutter delayed by an IPP from the upper output range gate.

18. A method for operating a pulse radar system, the steps of the method comprising:
using an antenna system to transmit and receive radio frequency signals;
generating successive transmit pulses and coupling the transmit pulses to the antenna system for radiation to a field of illumination defined by operation of the antenna system;

varying lengths of successive interpulse periods (IPPs) between the successive transmit pulses in accordance with a pattern thereby enabling the radar system to avoid false rejections of moving targets;

converting a composite, analog radio frequency signal received from the antenna system to a baseband video signal comprising a stream of digital data having combined in-phase and quadrature components; the digital data stream formed by successive range gates generated at a set sampling rate and representing information content in the radio frequency signal including target information and stationary and moving clutter information;

processing each range gate in a group of range gates including successive range gates preceding the range gate being processed and successive range gates subsequent to the range gate being processed to determine signal characteristics present in a preponderance of the range gates in the group as being unwanted; the processing step further adaptively cancelling unwanted signal characteristics thereby generating range gates which contain target information as digital target signals containing little or no residue of stationary or moving clutter;

synchronizing the transmit pulse generating and range gate processing steps; and processing and displaying the target signals.

19. The method of claim 18 wherein the method is adapted for operationg a moving target indicator (MTI) radar system for airport traffic control, and the using step includes a substep of operating the antenna system with 360 degrees scanning for detection of targets including aircraft.

20. The method of claim 18 wherein the processing step employs a lattice filter structured to cancel signal characteristics as defined and to generate the digital target signals.

21. The method of claim 20 wherein the lattice filter includes at least one adaptive filter block having an upper line to which incoming range gates are applied and a lower line to which incoming range gates are applied with an IPP time delay; the adaptive block includes upper, middle, and lower computing chains having respective sliding window integrators; each sliding window integrator having an adaptive window of N range gates; and the processing step includes the following substeps:

coupling incoming range gates on the upper line to an input of the upper computing chain;

coupling incoming IPP delayed range gates on the lower line to an input of the lower computing chain;

coupling incoming range gates on the upper line and the conjugate of incoming IPP delayed range gates on the lower line to an input of the middle computing chain;

generating an upper adaptive coefficient from outputs generated for each range gate by the upper and middle computing chains, and multiplying the upper adaptive coefficient against a corresponding time delayed range gate on the upper line to generate a first adaptively modified output;

generating a lower adaptive coefficient from outputs generated for each range gate by the lower and middle computing chains, and multiplying the lower adaptive coefficient against a corresponding further time delayed range gate on the lower line to generate a second adaptively modified output;

subtracting the second adaptively modified output from the time delayed range gate on the upper line to produce an upper output range gate with cancelled clutter; and subtracting the first adaptively modified output from the further time delayed range gate on the lower line to produce a lower output range gate with cancelled clutter delayed by an IPP from the upper output range gate.

* * * * *